(12) United States Patent
Pressley et al.

(10) Patent No.: US 11,851,355 B2
(45) Date of Patent: Dec. 26, 2023

(54) METHODS AND SYSTEMS FOR DIGESTING BIOSOLIDS AND RECOVERING PHOSPHORUS

(71) Applicants: Richard Pressley, Cocoa Beach, FL (US); Justin Wippo, Highland, IN (US); John H. Graham, Jr., Woodridge, IL (US)

(72) Inventors: Richard Pressley, Cocoa Beach, FL (US); Justin Wippo, Highland, IN (US); John H. Graham, Jr., Woodridge, IL (US)

( * ) Notice: Subject to any disclaimer, the term of this patent is extended or adjusted under 35 U.S.C. 154(b) by 265 days.

(21) Appl. No.: 17/276,413

(22) PCT Filed: Sep. 13, 2019

(86) PCT No.: PCT/US2019/051125
§ 371 (c)(1),
(2) Date: Mar. 15, 2021

(87) PCT Pub. No.: WO2020/056335
PCT Pub. Date: Mar. 19, 2020

(65) Prior Publication Data
US 2022/0073391 A1 Mar. 10, 2022

Related U.S. Application Data

(60) Provisional application No. 62/731,054, filed on Sep. 13, 2018, provisional application No. 62/863,647, filed on Jun. 19, 2019.

(51) Int. Cl.
C02F 11/04 (2006.01)
C02F 11/12 (2019.01)
(Continued)

(52) U.S. Cl.
CPC ............... *C02F 11/04* (2013.01); *C02F 1/66* (2013.01); *C02F 3/2866* (2013.01); *C02F 3/308* (2013.01);
(Continued)

(58) Field of Classification Search
CPC .......... C02F 11/04; C02F 1/66; C02F 3/2866; C02F 3/308; C02F 3/343; C02F 11/02;
(Continued)

(56) References Cited

U.S. PATENT DOCUMENTS 5,182,021 A   1/1993   Spector
5,811,009 A   9/1998   Kos
(Continued)

FOREIGN PATENT DOCUMENTS

CN   106242241 A   * 12/2016
CN   110436723 A   * 11/2019
(Continued)

OTHER PUBLICATIONS

Machine-generated English translation of CN 106242241, generated on Feb. 23, 2023.*
(Continued)

*Primary Examiner* — Fred Prince
(74) *Attorney, Agent, or Firm* — Neal, Gerber & Eisenberg LLP

(57) ABSTRACT

Processes and system are provided for digesting biosolids in a multistage digestion system. The processes and system are well suited for producing Class A biosolids and biogas containing a high content of methane. Methods and systems are also provided for recovery of phosphorus from wastewater and biosolids.

19 Claims, 25 Drawing Sheets

(51) Int. Cl.
  *C02F 11/14* (2019.01)
  *C02F 1/66* (2023.01)
  *C02F 3/28* (2023.01)
  *C02F 3/30* (2023.01)
  *C02F 3/34* (2023.01)
  *C02F 11/02* (2006.01)
  *C02F 101/10* (2006.01)

(52) U.S. Cl.
  CPC ............ *C02F 3/343* (2013.01); *C02F 11/02* (2013.01); *C02F 11/12* (2013.01); *C02F 11/14* (2013.01); *C02F 3/302* (2013.01); *C02F 2101/105* (2013.01); *C02F 2209/005* (2013.01); *C02F 2209/06* (2013.01); *C02F 2209/08* (2013.01); *C02F 2209/12* (2013.01); *C02F 2209/14* (2013.01); *C02F 2209/24* (2013.01); *C02F 2301/106* (2013.01); *Y02E 50/30* (2013.01); *Y02W 10/20* (2015.05)

(58) Field of Classification Search
  CPC .......... C02F 11/12; C02F 11/14; C02F 3/302; C02F 2101/105; C02F 2209/005; C02F 2209/06; C02F 2209/08; C02F 2209/12; C02F 2209/14; C02F 2209/24; C02F 2301/106; Y02E 50/30; Y02W 10/20
  USPC ....... 210/603, 605, 622, 623, 631, 903, 906; 71/10, 11, 32, 37
  See application file for complete search history.

(56) References Cited

U.S. PATENT DOCUMENTS

| | | | |
|---|---|---|---|
| 5,948,261 | A | 9/1999 | Pressley |
| 6,168,717 | B1 | 1/2001 | Pressley et al. |
| 6,203,701 | B1 | 3/2001 | Pressley et al. |
| 6,217,768 | B1 | 4/2001 | Hansen et al. |
| 6,514,411 | B2 | 2/2003 | Pressley et al. |
| 6,685,834 | B1 | 2/2004 | Murthy et al. |
| 6,719,903 | B1 | 4/2004 | Pressley et al. |
| 7,182,872 | B2 | 2/2007 | Barak et al. |
| 7,344,643 | B2 | 3/2008 | Elefritz et al. |
| 7,604,740 | B2 | 10/2009 | Baur |
| 7,833,415 | B2 | 11/2010 | Murthy et al. |
| 7,842,186 | B2 | 11/2010 | Chung et al. |
| 8,158,089 | B2 | 4/2012 | Zhang et al. |
| 8,221,627 | B2 | 7/2012 | Staton et al. |
| 8,263,034 | B2 | 9/2012 | Chung |
| 8,496,827 | B2 | 7/2013 | Baur |
| 8,864,992 | B2 | 10/2014 | Barak |
| 8,894,856 | B2 | 11/2014 | Liu et al. |
| 9,670,083 | B2 | 6/2017 | Wett et al. |
| 2005/0035059 | A1 | 2/2005 | Zhang et al. |
| 2007/0102353 | A1 | 5/2007 | Murthy et al. |
| 2009/0107913 | A1 | 4/2009 | Johnson |
| 2010/0021979 | A1 | 1/2010 | Facey et al. |
| 2010/0044318 | A1 | 2/2010 | Stanton et al. |
| 2011/0259821 | A1 | 10/2011 | Liu et al. |
| 2012/0135491 | A1 | 5/2012 | Guenter |
| 2017/0044574 | A1 | 2/2017 | Pidaparti et al. |
| 2018/0022626 | A1 | 1/2018 | Pardo et al. |

FOREIGN PATENT DOCUMENTS

| | | |
|---|---|---|
| EP | 3567012 A1 * | 11/2019 |
| WO | 2004028981 A1 | 4/2004 |

OTHER PUBLICATIONS

Machine-generated English translation of CN 110436723, generated on Feb. 23, 2023.*

Extended European Search Report issued for EP Patent Application No. 19859779.1 dated Jun. 22, 2022, 8 pages.

Battistoni, P., et al., "Phosphate removal in anaerobic liquors by struvite crystallization without addition of chemicals: Preliminary results," Water Research, 1997, vol. 31(11), pp. 2925-2929, abstract only.

Bible, D., et al., "Two-Phase Anaerobic Digestion for Class A Biosolids at Moccasin Bend WWTP," Proceedings of the Water Environment Federation, 2006, vol. 2006(2), pp. 705-715.

Carroll, J.R., et al., "Optimization Of Nitrification / Denitrification Process Performance and Reliability at the Blue Plains Advanced Wastewater Treatment Plant", Proceedings of the Water Environment Federation, 2005, vol. 2005(15), pp. 1207-1228.

Çelen, I., et al., "Recovery of Ammonia as Struvite from Anaerobic Digester Effluents," Environmental Technology, vol. 22(11), 2001, pp. 1263-1272.

Haslam, E, et al., "Biosolids Treatment", NYWEA. Spring Meeting Technical Conference. Jun. 13, 2018. 20 pages www.thermalprocess.com.

Kuo, Jeff, et al., "Biogas Production from Anaerobic Digestion of Food Waste and Relevant Air Quality Implications," Journal of the Air & Waste Management Association, 2017, vol. 67(9), pp. 1000-1011.

McDonald, B.M, et al., "Influence of pH on the Hydrolytic and Acidogenic Phases During Anaerobic Digestion of Waste Activated Solids in a Batch System", 2017, 7 pages. retrieved from https://www.waternz.org.nz/Attachment?Action=Download&Attachment_id=995.

Thermal Process Systems. (2016). SNDR™ Applications Report. 2 pages. Retrieved from https://www.thermalprocess.com/media/documents/Speedway_final_4.pdf.

Thermal Process Systems. (2016). TPS MesoAer Proccess: Take Control with MesoAer! 4 pages. Retrieved from https://www.thermalprocess.com/userfiles/file/MesoAer%202016_FINAL.pdf.

Thermal Process Systems. (2016). TPS ThermAer Process: Your Class A Solution for Biosolids Management. 12 pages. Retrieved from http://thermalprocess.com/media/documents/thermal-process-brochure.pdf.

Thermal Process Systems. (2021). The Ex-CalibAer Process [Brochure]. 27 pages.

Thermal Process Systems, Inc. (2019). Optimizing Two-Stage Anaerobic Digestion via Recycle from form Aerobic Digester [Brochure]. 21 pages.

Tonkovic, Z., "Aerobic Stabilisation Criteria for BNR Biosolids," Wat. Sci. Tech., 1998, vol. 38(2), pp. 133-141.

Wippo, J., et al., "Optimizing Two-Stage Anaerobic Digestion via Recycle From an Aerobic Digester," Florida Water Resources Journal, Jun. 2020, pp. 16-18.

* cited by examiner

| Test | Acid | AD | ATAD | SNDR |
|---|---|---|---|---|
| VFA (mg/L) | 3001 | 1249 | N/A | N/A |
| Alkalinity (mg/L) | 2785 | 3955 | 2643 | 591 |
| COD (mg/L) | 8817 | 5373 | 6310 | 4141 |
| Ammonia (mg/L) | 1521 | 1645 | 1738 | 360 |
| Phosphate (mg/L) | 183 | 152 | 257 | 145 |
| $CO_2$ (%) | N/A | 37.7% | N/A | N/A |
| $H_2S$ (ppm) | 0.82 | 15.5 | 0.14 | 0 |
| $NH_3$ (ppm) | 327 | 186 | 882 | 0 |

FIG. 8

| Sample | Total Solids (%) | Coagulant (mL Ferric Sulfate) | Flocculant (mL Polymer) | Cake Solids (%) | Coagulant (active lb/dry ton) | Flocculant (active lb/dry ton) |
|---|---|---|---|---|---|---|
| Pilot SNDR | 1.82 | 0.6 | 7 | 27.12 | 113 | 15 |

FIG. 9

| Average VS Destruction | | | |
|---|---|---|---|
| AD | ATAD | SNDR | Total |
| 55.4% | 10.0% | 12.5% | 64.8% |

| Average VS Destruction | | |
|---|---|---|
| AD | SNDR | Total |
| 57.7% | 15.3% | 64.3% |

FIG. 13

| AD Biogas Averages | |
|---|---|
| Hydrogen Sulfide (ppm) | 21.0 |
| Ammonia (ppm) | 6.06 |
| Carbon Dioxide (%) | 38.1% |
| Methane (%) | 61.9% |
| Biogas produced (ft^3/lb VS) | 13.47 |

| AD VFAs and Alkalinity | |
|---|---|
| VFAs (mg/L) | 938 |
| ALK (mg/L) | 3372 |
| VFA/ALK | 0.28 |
| VFA Conversion | 57% |

FIG. 14

| Sample | Total Solids (%) | Coagulant (mL Ferric Sulfate) | Flocculant (mL Polymer) | Cake Solids (%) | Coagulant (active lb/dry ton) | Flocculant (active lb/dry ton) |
|---|---|---|---|---|---|---|
| Pilot SNDR | 1.90 | 0 | 5 | 28.7 | 0 | 10 |

FIG. 15

Acidification

| Analysis | Level Found As Received | Level Found Dry Weight | Units | Reporting Limit | Method |
|---|---|---|---|---|---|
| Sample ID PHOS RAW Lab Number 2845238 | Date Sampled 2018-09-04 1530 | | | | |
| Fecal coliforms | 4 | 134 | MPN/g | 2 | SM 9221 E- (2006) |
| Percent solids | 2.99 | | % | 0.01 | SM 2540 G-(1997) * |
| Sample ID PHOS ACID Lab Number 2845239 | Date Sampled 2018-09-04 1530 | | | | |
| Fecal coliforms | n.d. | n.d. | MPN/g | 2 | SM 9221 E- (2006) |
| Percent solids | 3.32 | | % | 0.01 | SM 2540 G-(1997) * | n.d. = not detected, MPN = most probable number

FIG. 16

Lab Testing Results

| | Low | High | Average |
|---|---|---|---|
| Total Phosphorus Solubilized | 74% | 96% | 83% |
| Soluble Phosphorus Precipitated | 91% | 93% | 92% |
| Total Phosphorus Removed | 72% | 89% | 79% |

FIG. 18

METHODS AND SYSTEMS FOR DIGESTING BIOSOLIDS AND RECOVERING PHOSPHORUS

CROSS-REFERENCE TO RELATED APPLICATIONS

This application is a national stage entry pursuant to 35 U.S.C. § 371 of International Application No. PCT/US2019/051125, filed on Sep. 13, 2019, which claims benefit of the filing dates and rights of priority to U.S. Provisional Application No. 62/731,054, filed on Sep. 13, 2018 and U.S. Provisional Application No. 62/863,647, filed on Jun. 19, 2019, all of which are incorporated by reference herein.

FIELD OF THE INVENTION

The present invention generally relates to digestion of biosolids derived from wastewater treatment. The present invention also relates to new methods and systems for recovery of phosphorus from wastewater and biosolids.

BACKGROUND

Wastewater such as sewage streams generally contains various naturally occurring and/or man-made contaminants, notably organic contaminants. Material settled out from wastewater is generally referred to as primary sludge, and material treated by another process is typically termed as secondary sludge. Generally the term "sludge" is used for the material generated from wastewater treatment, while the term "biosolids" is used for sludge or material derived from wastewater or other sources that is further treated such as by digestion.

Some naturally occurring microorganisms have the ability to consume these contaminants for their own life processes, thereby turning an undesirable pollutant into (for their purposes) a beneficial nutrient or food source. The wastewater treatment industry frequently capitalizes on the ability of these microorganisms by using such microorganisms in facilities that treat wastewater streams to destroy the contaminants and break them down into basic compounds.

The desired result of wastewater treatment is destruction of organic contaminants, but wastewater treatment also produces or increases sludge, which includes microorganisms. As a result, disposal of material derived from wastewater may be subject to practical and/or legal restrictions even after many contaminants have been addressed by treatment. One problem arises from the human pathogenic nature of many microorganisms. Although some microorganisms can be beneficial in consuming contaminants, they themselves pose a danger to human health and are disease-causing organisms. States, counties, cities, and/or the federal government impose restrictions upon land disposal of material containing pathogenic microorganisms. It is desirable to treat sludge so that one can easily and legally dispose of the treated sludge (now termed biosolids) on land or underground. In fact, suitably treated biosolids may prove to have beneficial uses. Under certain circumstances, treated biosolids may be used a soil conditioner or fertilizer similar to compost material.

Biosolids and sludge also contain other materials including microorganisms which are not pathogenic in nature. Typically material from wastewater includes a group of microorganisms that thrive in what is generally referred to as the thermophilic temperature range, temperatures greater than 45° C. The thermophilic microorganisms are normally not harmful to humans, and there exists both aerobic and anaerobic microorganisms that thrive within the thermophilic range. Thermophilic digestion activity usually takes place within the range from about 45° C. to about 75° C. In contrast, pathogenic microorganisms usually thrive within a more narrow mesophilic range, which is from about 25° C. to about 37° C., or the normal body temperature of humans. Some of these microorganisms may begin to die at about 38° C.

Various methods have been proposed and practiced for treating the biosolids resulting from treatment of wastewaters. Biosolids may be digested aerobically or anaerobically, with different microorganisms (biologically), as well as chemically, and/or physically. Biosolids can also be digested in a thermophilic digestion environment. Among the methods available for treatment is autothermal thermophilic aerobic digestion (ATAD). ATAD capitalizes on the presence of materials in the biosolids such as naturally occurring microorganisms which are not pathogenic or harmful to humans. Additionally, operations at these high temperatures inactivate the pathogenic microorganisms. Additional information regarding ATAD treatment of sludge is available in U.S. Pat. Nos. 5,948,261, 6,168,717, 6,203,701, 6,514,411 and 6,719,903 (assigned to Thermal Process Systems, LLC, of Crown Point, Ind.). An exemplary ATAD system is the THERMAER system available from Thermal Process Systems.

In a typical ATAD process, biosolids resulting from wastewater treatment is aerobically and thermophilically digested in a reactor, which has sufficient oxygen available for aerobic microorganisms. The reactor operates at a temperature of a thermophilic digestion environment from about 45° C. to about 75° C., or even higher. Within this temperature range, thermophilic microorganisms are active, in an aerobic process where they utilize oxygen for respiration, as they assimilate these contaminates.

Biosolids can also be treated by anaerobic digestion in which microorganisms break down biodegradable material in the absence of oxygen. The anaerobic digestion process typically begins with hydrolysis of insoluble organic polymers that are present in sludge, such as carbohydrates and starches. By hydrolysis, such components are broken down to soluble derivatives that become available for other microorganisms. Acidogenic microorganisms convert the sugars and amino acids into carbon dioxide, hydrogen, ammonia, and organic acids. These microorganisms convert these resulting organic acids into acetic acid, along with additional ammonia, hydrogen, and carbon dioxide. Finally, methanogens (primarily methanogenic archaea) convert these products to methane and carbon dioxide.

Pidaparti et al. US 20170044574 discusses methods for anaerobic digestion of organic matter to produce biogas. Among the techniques given are including ferric iron in a hydrolysis reactor to increase the rate and efficiency of anaerobic hydrolysis to provide substrates for methanogenesis. A solids separation step is added after hydrolysis and before methanogenesis to improve the efficiency of the methanogenesis step. Other techniques involve using separate tanks for the hydrolysis and methanogenesis stages and using two (or more) methanogenesis tanks in sequence, and switching the order of the two (or more) methanogenesis tanks periodically.

The digestion of biosolids, either aerobically or anaerobically, generates byproducts from within bacterial cells and from breaking down components in the sludge. One of these byproducts is nitrogen which quickly converts to ammonia. Ammonia raises the pH of the digesting biosolids and may cause odors. Other byproducts include biopolymers, proteins, polysaccharides, and volatile fatty acids (VFAs). Higher concentrations of any of these byproducts often result in higher requirements of chemical conditioners and polymers for dewatering. It is thus desirable to have some way to reduce the amount of these byproducts.

To reduce these byproducts, various methods have been proposed and practiced for the conditioning of digested biosolids, including composting, irradiation, pasteurization and drying. There are various concerns and disadvantages for each of these approaches for treating the byproducts, such as energy and chemical costs.

In addition, nitrification and denitrification steps have been used to treat wastewater, and have been used to treat digested biosolids in mesophilic environments. Among the methods available for nitrification and denitrification is a storage nitrification/denitrification reactor (SNDR). An SNDR can be operated so that an oxygen content is provided in the digested biosolids to promote nitrification of ammonia within the biosolids in the reactor. After a measured parameter reaches a desired threshold, the oxygen content can be adjusted (preferably in automated fashion) to promote denitrification of nitrates and nitrites within the biosolids in the reactor. The reduction in concentration of one or more digestion byproducts in the digested biosolids provides a conditioned biosolids product. Additional information regarding nitrification/denitrification of digested sludge is available in U.S. Pat. No. 8,221,627 (assigned to Thermal Process Systems, LLC, of Crown Point, Ind.). An exemplary SNDR system is available from Thermal Process Systems. Other nitrification and denitrification processes for the post-digestion treatment of biosolids rely on the addition of large amounts of supplemental alkalinity, usually lime.

A challenge in the conditioning of digested biosolids is that the temperature of the digested biosolids is typically from about 45° C. to about 75° C., and therefore the digested biosolids must be cooled for conditioning. This is due to the mesophilic nature of the nitrifying and denitrifying microorganisms. Existing approaches for controlling and regulating the temperature of the conditioning tanks include the use of heat exchangers or natural convection.

Struvite ($MgNH_4PO_4 \cdot 6H_2O$) precipitation is a significant concern for most waste treatment operations, as it can result in the clogging of pipes and other equipment. Formation of struvite is most prominent when the components (magnesium, ammonium, and phosphate) are in significant concentration, pH becomes too high, and/or temperature significantly increases.

SUMMARY OF THE INVENTION

As one aspect of the present invention, processes are provided for digesting biosolids and producing biogas. The processes comprises hydrolyzing insoluble organic polymers in a sludge derived from wastewater in an acidic hydrolysis environment having a pH from 5 to 6 to produce hydrolyzed biosolids. The hydrolyzing of the insoluble organic polymers yields volatile fatty acids (VFAs). The acidic hydrolysis environment is adapted to yield a reduced or low amount of methane. The processes also comprises fermenting the VFAs of the hydrolyzed biosolids in an anaerobic digestion environment having a pH from 6 to 8, preferably about 7 or below 7, to produce anaerobically digested biosolids and biogas comprising an increased or high amount of methane. In some embodiments, the processes comprise digesting the anaerobically digested biosolids in a thermophilic aerobic digestion environment to produce thermophilically digested biosolids, followed by digesting the thermophilically digested biosolids in a mesophilic digestion environment to produce mesophilically digested biosolids. In other embodiments, the processes comprise digesting the anaerobically digested biosolids in a mesophilic digestion environment to produce mesophilically digested biosolids.

As another aspect of the present invention, a system for digesting biosolids is provided. The system comprises an acidic hydrolysis reactor and an anaerobic digestion reactor fluidly connected to the acidic hydrolysis reactor so as to receive hydrolyzed biosolids. The anaerobic digestion reactor is adapted for maintaining an anaerobic digestion environment to produce anaerobically digested biosolids. In some embodiments, the system also comprises a thermophilic aerobic digestion reactor fluidly connected to the anaerobic digestion reactor so as to receive the anaerobically digested biosolids, and a mesophilic digestion reactor fluidly connected to the thermophilic aerobic reactor so as to receive the thermophilically aerobically digested biosolids. In other embodiments, the system comprises a mesophilic digestion reactor fluidly connected to the anaerobic reactor so as to receive the anaerobically digested biosolids.

As another aspect of the present invention, a process for digesting biosolids is provided. The process comprises hydrolyzing insoluble organic polymers in a sludge derived from wastewater in an acidic hydrolysis environment having a pH between 5 and 6 to produce hydrolyzed biosolids. The hydrolyzed biosolids are fermented in an anaerobic digestion environment to produce anaerobically digested biosolids and biogas. Optionally, the anaerobically digested biosolids can be further digested in a thermophilic aerobic digestion environment to produce thermophilically digested biosolids. Then, the anaerobically digested biosolids (or the thermophilically digested biosolids if that option is used) are digested in a mesophilic digestion environment to produce mesophilically digested biosolids comprising nitrates at a concentration. An amount of the mesophilically digested biosolids is transferred to the acidic hydrolysis environment. The transferred amount is sufficient to (a) lower one or both of ammonia and pH in the anaerobic digestion environment in an amount sufficient to reduce precipitate formation potential; and/or (b) supply the nitrates from the mesophilic digestion environment to the acidic hydrolysis environment in an amount sufficient to inhibit activity of sulfate-reducing bacteria. The transferred amount of the mesophilically digested biosolids may also be sufficient to reduce formation of $H_2S$ in the anaerobic digestion environment and/or to lower concentration of $H_2S$ in the biogas. In some embodiments, the process further comprises mixing the digested biosolids with an oxygen-containing fluid to promote nitrification of the biosolids in the mesophilic digestion environment and to inhibit denitrification. Denitrification occurs when the mesophilically digested material is transferred back to the anaerobic acidic hydrolysis environment. The nitrates are reduced so that nitrogen is released as $N_2$ gas, the oxygen that was bonded oxidizes sulfides, and the growth kinetics of sulfate-reducing bacteria are inhibited. In some embodiments, the transferred amount is sufficient to (a) lower the ammonia in the anaerobic digestion environment to 500 mg/L; or (b) lower the pH in the anaerobic digestion environment to 6.6; or (c) supply enough nitrates to the acidic hydrolysis environment to achieve a minimum nitrate to sulfide ratio of 8:5; or (d) limit $H_2S$ in the biogas to less than 4 ppm, or any combination of (a), (b), (c) and (d).

As another aspect, a system for digesting biosolids is provided. The system comprises an acidic hydrolysis reactor, and an anaerobic digestion reactor fluidly connected to the acidic hydrolysis reactor so as to receive hydrolyzed biosolids. The anaerobic digestion reactor is adapted for maintaining an anaerobic digestion environment to produce anaerobically digested biosolids. The system also comprises a mesophilic digestion reactor fluidly connected to the anaerobic reactor so as to receive the anaerobically digested biosolids. The mesophilic digestion is adapted for nitrification of digested biosolids to produce mesophilically digested biosolids having a high concentration of nitrates. The system also comprises a recycle conduit fluidically connecting the mesophilic digestion reactor and the acidic hydrolysis reactor, optionally passing through a boiler or a heat exchanger.

As yet another aspect, a process for reducing hydrogen sulfide in biogas from wastewater is provided. The process comprises feeding a wastewater to an acidic environment having a pH between 5 and 6 to produce acidified wastewater. The acidified wastewater is transferred to an anaerobic environment, in which anaerobically treated wastewater is produced. The anaerobically treated wastewater is transferred to an BOD/COD removal environment, in which BOD/COD reduced wastewater is produced. The BOD/COD reduced wastewater is transferred to an aerobic environment, in which aerobically treated wastewater comprising nitrates is produced. The concentration of nitrates may be known from testing, estimated, or unknown. The process also comprises recycling an amount of the aerobically treated wastewater to the acidic environment. Optionally the aerobically treated wastewater passes through a clarifier or a heat exchanger (or both, or another device or reactor) between the aerobic environment and the acidic environment. The amount of aerobically treated wastewater transferred from the aerobic environment to the acidic environment is sufficient to supply the nitrates in an amount sufficient to inhibit activity of sulfate-reducing bacteria. In some embodiments, the process further comprises collecting biogas from the anaerobic environment. The collected biogas can be a sweet gas and/or comprise less than 4 ppm of hydrogen sulfide.

As another aspect of the present invention, a system is provided for treating wastewater. The system comprises an acidic reactor, and an anaerobic reactor fluidly connected to the acidic reactor so as to receive acidified wastewater. The anaerobic reactor is adapted for maintaining an anaerobic environment to produce anaerobically treated wastewater. The system also comprises a BOD/COD removal reactor fluidly connected to the anaerobic reactor so as to receive the anaerobically treated wastewater. The BOD/COD removal reactor is adapted for maintaining a temperature and oxygen content sufficient to reduce BOD, COD, or both, and produce BOD/COD reduced wastewater. The system also comprises a mesophilic reactor fluidly connected to the BOD/COD removal reactor so as to receive the BOD/COD reduced wastewater. The mesophilic digestion is adapted for nitrification of BOD/COD reduced wastewater to produce mesophilically treated wastewater. The system also comprises a recycle conduit fluidically connecting the mesophilic reactor and the acidic reactor, optionally passing through a clarifier or a heat exchanger.

In some embodiments of the foregoing processes and systems, the mesophilically digested biosolids, or a portion thereof, are transferred to the acidic hydrolysis environment through a recycle conduit. In some embodiments, the processes further comprise measuring one or more of pH, ammonia, VFAs, sulfur, $CO_2$, sCOD, temperature, or another parameter indicative of a stressed condition, and combinations thereof, in the thermophilic or mesophilic digestion environment or both to obtain one or more measurements; and adjusting the recycling or transfer of mesophilically digested biosolids based on the one or more measurements.

In some embodiments of the foregoing processes and systems, the hydrolyzed biosolids have a VFA concentration of at least 1000 mg/L. In some embodiments, at least 10 cubic feet biogas per pound of volatile solids destruction per day are recovered from the anaerobic digestion environment. The biogas can be at least 60% v/v methane, alternatively at least 70% v/v methane.

The processes and systems further comprise controlling or a controller for input and output of material to each of the digestion environments to provide a hydraulic retention time (HRT) for material in each. In some embodiments, HRT in the acidic hydrolysis environment is shorter than the HRT in the anaerobic digestion environment.

In some embodiments, material from the thermophilic digestion environment and/or the mesophilic digestion environment is transferred to the acidic hydrolysis environment directly, without a heat exchanger, which allows recovery of the heat contained in the mesophilically digested biosolids. In some embodiments, an amount of the thermophilically digested biosolids and/or an amount of the mesophilically digested biosolids is recycled to the acidic hydrolysis environment; one or more of pH, ammonia, VFA, sulfur, $CO_2$, or sCOD in the thermophilic aerobic or mesophilic digestion environment or both are measured to obtain one or more measurements; and the recycling is adjusted based on the one or more measurements. In some embodiments, the amount of recycle or transferred material is sufficient to lower VFAs in the acidic hydrolysis environment, for example, by at least 25% or 35% or to provide a VFA to alkalinity ratio of 1.8 or less, alternatively or 1 or less, alternatively 0.4 or less. In some embodiments, the amount of recycled or transferred material is sufficient to lower the ammonia concentration to 800 mg/L or less, alternatively 500 mg/L or less.

In some embodiments, a recycle conduit is configured to transfer material to the acidic hydrolysis reactor from one or both of the mesophilic reactor and the thermophilic reactor, the recycle conduit being configured so that material from the mesophilic reactor and/or the thermophilic reactor is transferred to the acidic hydrolysis reactor.

As yet another aspect of the present invention, methods are provided for removing phosphorus from conditioned biosolids such as digested biosolids. In such methods, conditioned biosolids (such as digested biosolids) having relatively low alkalinity are provided. When the biosolids have been thermophilically digested, an acid is added to the conditioned biosolids in an acidification tank/environment to reduce their pH to 4 or less for an acidification period (the period can be an average residence time in a reactor, such as HRT) to produce acidified biosolids rich in soluble phosphorus. Then the pH of the acidified biosolids is adjusted to 4 or higher, such as by adding a strong base while the acidified biosolids are transferred to a separation tank. Then, the method produces phosphorus-rich centrate (a liquid portion) by separating the centrate from dewatered digested phosphorus-lean biosolids (a solid portion) in the acidified biosolids; in other words, the acidified biosolids are separated into a liquid portion and a solids portion in a separation tank/environment. The centrate are removed from the separation tank and transferred to a precipitation tank, and their pH is adjusted to 7 or higher, alternatively from 8 to 10, alternatively 9.5. A phosphorus-rich precipitate is recovered from the centrate biosolids, and a phosphorus-lean effluent is removed from the precipitation tank/environment.

As another aspect of the present invention, systems are provided for removing phosphorus from conditioned biosolids such as digested biosolids, The system can comprise an acidification tank/environment fluidly connected to a source of conditioned biosolids, such as an SNDR or an mesophilic aerobic nitrification reactor or the biosolids treatment systems described herein. An acid source is configured to add an acid to conditioned biosolids, before, during or after transfer to the acidification tank. A liquid/solid separation tank/environment is fluidly connected to the acidification tank, wherein the separation tank is adapted to separate the acidified biosolids into a phosphorus-rich centrate biosolids (a liquid portion) and a dewatered digested phosphorus-lean DDPL biosolids (a solid portion). A precipitation tank/environment is fluidly connected to the separation tank. A base source is configured to add a base to the precipitation tank.

As yet another aspect, a method for removing phosphorus from conditioned biosolids is provided. The method comprises providing conditioned biosolids from the mesophilic aerobic reactor having relatively low alkalinity. An acid is added to the conditioned biosolids when the biosolids have been thermophilically digested to reduce pH to 4 or less to produce acidified biosolids rich in soluble phosphorus. The pH of the acidified biosolids is adjusted to 4 or higher. The method also comprises producing phosphorus-rich centrate by separating the centrate from biosolids from dewatered digested phosphorus-lean biosolids in the acidified biosolids.

As another aspect, a system for removing phosphorus from conditioned biosolids is provided. The system comprises an acidification tank fluidly connected to a source of conditioned biosolids; an acid source configured to add an acid to conditioned biosolids that have been thermophilically digested; a liquid/solid separation tank fluidly connected to the acidification tank, wherein the separation tank is adapted to separate the acidified biosolids into a phosphorus-rich centrate biosolids and a dewatered digested phosphorus-lean biosolids; and a precipitation tank fluidly connected to the separation tank.

In some embodiments, the conditioned biosolids have been conditioned in an SNDR or a mesophilic aerobic reactor, and have a pH of 7 or lower, alternatively from 6 to 7. For example, the conditioned biosolids can be are mesophilically digested biosolids from any of embodiments described herein. The method or system can further comprising adding water and/or polymer to the acidified biosolids before or during the adjusting of the pH. A metal source can be fluidly connected to the precipitation tank to add metals that promote precipitation of phosphorus containing minerals such as struvite or brushite. In some embodiments, the dewatered digested phosphorus-lean biosolids are Class A biosolids. The phosphorous-rich precipitate can be packaged as a fertilizer, or and in some systems, packaging equipment is connected to an outlet of the separation tank. In some embodiments, at least a portion of the effluent is combined with the acidified biosolids. In some embodiments, at least a portion of material from the acidification tank and/or the precipitation tank is transferred to an acidic hydrolysis reactor/environment or to an acidic hydrolysis reactor as described herein.

A slide presentation entitled ThermAnAer™ and Targeted Phosphorus Recovery is attached and is incorporated herein in its entirety.

BRIEF DESCRIPTION OF THE FIGURES

FIGS. 4 to 9 provide various experimental results and measurements.

FIGS. 12 to 18 provide various experimental results and measurements.

FIGS. 21 to 27 provide various experimental results and measurements.

DETAILED DESCRIPTION OF THE INVENTION

Figure 1:
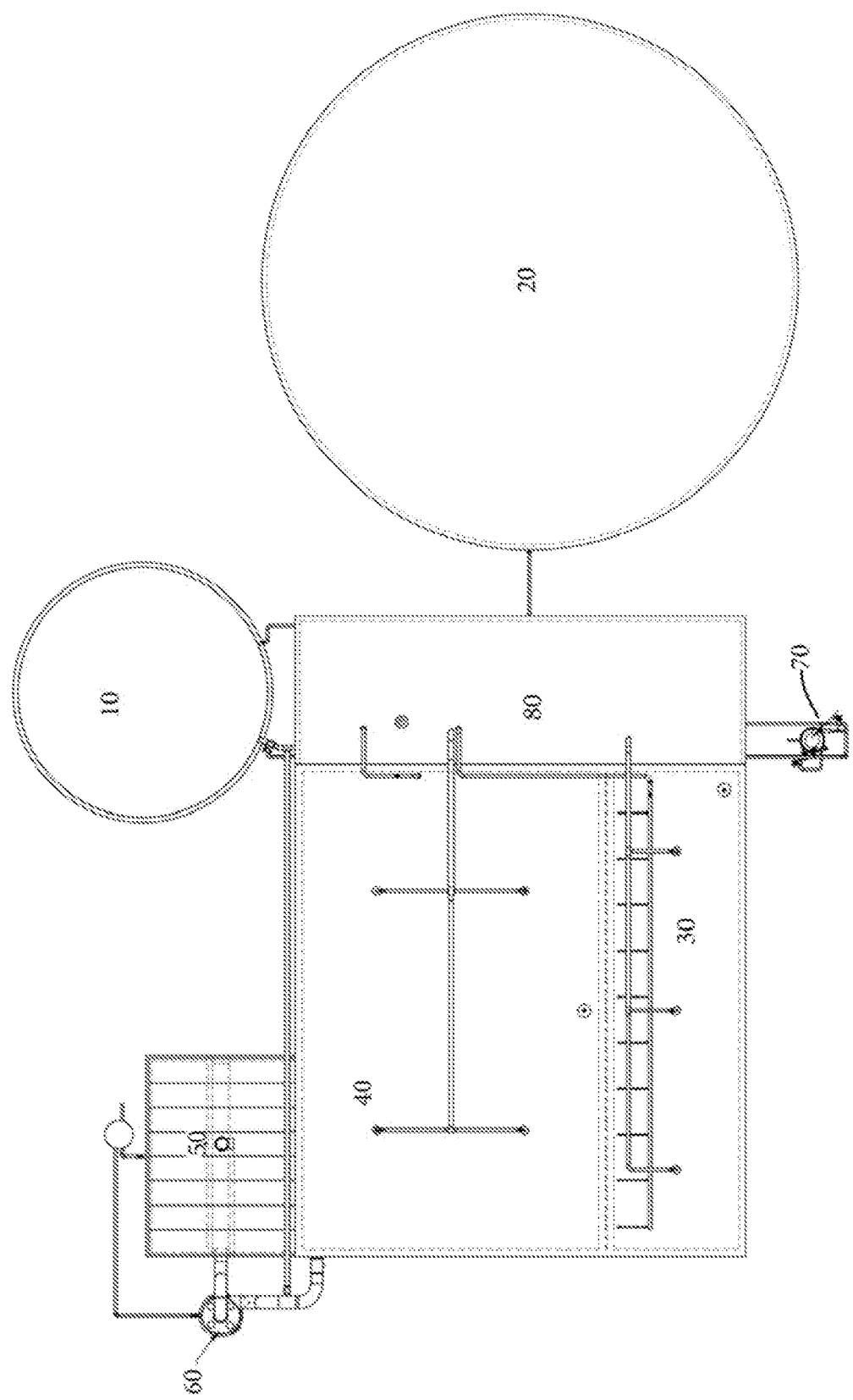
FIG. 1 is a system plan for an embodiment of the present processes and system.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any processes and materials similar or equivalent to those described herein can also be used in the practice or testing of the present invention, the preferred processes and materials are now described.

All publications and patents cited in this specification are herein incorporated by reference as if each individual publication or patent were specifically and individually indicated to be incorporated by reference and are incorporated herein by reference to disclose and describe the processes and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

The singular forms "a", "an", and "the" include plural referents unless the context clearly dictates otherwise. It is further noted that any optional element can be excluded. As such, this statement is intended to serve as antecedent basis for use of such exclusive terminology as "solely," "only" and the like in connection with the recitation of claim elements, or use of a "negative" limitation.

An "environment" refers to a space or volume having conditions such as temperature, pH, oxygen availability and others for digestion or other action on the materials described herein. An environment may be partially or fully isolated from another environment having different conditions. Such an environment can be produced or found in a "reactor", which refers to a tank, vessel, or any other container for holding the materials described herein. When an environment is described in the present disclosure, it should be understood that a reactor adapted for providing such an environment is also described. Likewise, when a reactor or tank is described in the present disclosure, it should be understood that an environment produced by such a reactor or tank in its operation is also described.

An "anaerobic environment" is one in which oxygen availability is low, and an "aerobic" environment is one in which oxygen availability is high.

A "thermophilic digestion environment" is one in which the temperature is greater than 45° C., preferably in the range of about 45° C. to about 75° C., or preferably in the range of about 50° C. to about 70° C. The thermophilic digestion environment can include a medium, such as an aqueous medium, and may contain biosolids to be digested or in the process of digestion. The medium can be a liquid, slurry, or other mixture, and may contain or more phases, such as gas dissolved in liquid and/or solids suspended in liquid. A thermophilic digestion environment is provided in an ATAD reactor during its operation.

A "mesophilic digestion environment" is one in which the temperature is in the range of 15° C. to 45° C., preferably in the range of 20° C. to 40° C., or preferably in the range of 25° C. to 37° C. The mesophilic digestion environment can include a medium as described.

A "hydraulic retention time" or HRT is the average length of time material spends in a reactor or environment before being transferred elsewhere.

A "culture" is a collection of microorganisms which may share one or more distinguishing features. A culture generally comprises multiple species of organisms.

A "stressed" environment or condition refers to one where a culture is impaired, injured or killed, or its activity in biosolids digestion is reduced or halted. In the context of this disclosure, toxicity is used in reference to cultures used in biosolids treatment, not in reference to humans or other animals.

The term "centrate" refers to a liquid portion separated from wastewater, biosolids or other material by any technique, such as settling, filtering, centrifuging, or other, and includes filtrate, liquor, and any other reference to a liquid portion.

The term "biogas" refers to a gas obtained from a biological source, such as biosolids or waterwater or other material A biogas typically has a high content of hydrocarbon, such as at least 60% v/v methane, alternatively at least 70% v/v methane. Biogas may be obtained as a sweet gas, which refers to a natural gas or other methane-containing gas that contains little or no hydrogen sulfide. Sweet gas generally can be used as a fuel with little or no refining. As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Any recited process can be carried out in the order of events recited or in any other order which is logically possible.

Methods and Systems for Multistage Treatment of Biosolids

The main activities in conventional anaerobic digestion of biosolids are hydrolysis which increases solubility of otherwise insoluble organic solids; fermentation of soluble organic solids into volatile fatty acid (VFAs); and production of methane from VFAs. It has been discovered that problems arise in single-stage anaerobic digestion units because these activities occur at different rates; the first two occurring rapidly while the conversion of VFAs to methane is relatively slow. Performing the entire anaerobic digestion process in a single stage is problematic because it is difficult for operators and engineers to understand the current state of the reactor at any given time. This makes it difficult to identify and correct any problems posed to the digestion system, such as a stressed reactor having an excessive amount of some component. The present process and system separate the activities of anaerobic treatment into separate environments in order to achieve a more reliable and more efficient treatment process for biosolids. Biosolids can be treated by acid hydrolysis before undergoing anaerobic digestion.

Mixing in anaerobic digestion processes can have significant effects on a system's performance. Methanogens proliferate slowly, growing in flocs. While some mixing is desired to stir the anaerobic environment, higher mixing rates may inhibit methanogens from functioning properly. Mixing in a reactor increases the shear forces present in the material. Hydrolysis is facilitated by increasing shear forces, meaning higher mixing rates will be beneficial to the acidic hydrolysis reactor. The capacity for different mixing of the acidic hydrolysis reactor and anaerobic environment with their respective pumps allows improved control the performance of the system.

It has been discovered that the various chemical and biological processes that take place in each reactor occur at different rates. As a result, different amounts of time are required to achieve the desired results of each reactor. The ability to manipulate the HRT of a reactor enables control of the extent of reactions. Shorter HRTs are ideal for rapid reactions and limiting product formation, while longer HRTs accommodate slower reactions and bring reactions closer to completion. Being able to alter the HRT of a given reactor is another means of controlling the processes within the tank.

Acidic Hydrolysis Reactor/Environment

In the present process and system, biosolids are fed into an acidic hydrolysis environment/reactor as an initial processing stage for biosolids. In some embodiments, the acidic hydrolysis reactor houses or is adapted for hydrolysis and VFA fermentation. These activities of anaerobic digestion occur more rapidly than the conversion of VFAs into a methane-rich biogas. Accumulation of VFAs can overwhelm methanogens, which are the methane-forming microorganisms present in anaerobic digestion. High VFA concentrations inhibit methane production and can render the methanogens unable to perform their task. As a result, VFA accumulation can often denote system stress and/or system failure.

In some embodiments, operation of the acidic hydrolysis reactor is adapted to achieve one or more of the following objectives: High VFA production, either on an overall basis, or based on selected HRT, pH, and temperature parameters; Simple and quick correction of VFA imbalances; Adjustable recycle streams from the thermophilic aerobic digestion reactor and/or mesophilic digestion reactor based on VFA production; Efficient and reliable heating of material introduced to the acidic hydrolysis reactor via recycle from downstream reactors.

In the acidic hydrolysis reactor, the biosolids undergo the first two stages of anaerobic digestion. Hydrolysis occurs first, where organic matter breaks down into soluble compounds. Once soluble, the material is fermented into VFAs such as acetic acid, propionic acid, and butyric acid.

Many of the insoluble compounds in the material are extracellular polymeric substances (EPS) that are comprised of molecules such as carbohydrates and proteins. Hydrolysis of the insoluble organic matter is accomplished in the presence of enzymes produced by the bacterial culture present in the acidic hydrolysis reactor. These enzymes help water break the glycosidic bonds present in EPS. Hydrolysis can be the rate-limiting step of anaerobic digestion; however, increasing shear forces in the material will facilitate the process. This is why the acidic hydrolysis reactor is continuously mixed at a higher rate than the anaerobic digestion reactor.

Once soluble, hydrolyzed material in the acidic hydrolysis reactor is fermented by the microorganisms present. The *Clostridium* species of bacteria are mesophilic, anaerobic acidogens that produce the hydrolytic enzymes to assist hydrolysis. These microorganisms decompose soluble organic matter into VFAs, primarily acetic acid, propionic acid, and butyric acid. As organic matter is hydrolyzed, *Clostridium* sp. will become acetogenic, breaking down larger VFAs into acetic acid, the precursor to methane formation.

Formation of VFAs is accompanied by the production of a small amount of hydrogen ($H_2$) and carbon dioxide ($CO_2$). In typical anaerobic digestion systems, hydrogen produced will react with sulfur-containing compounds to form hazardous hydrogen sulfide ($H_2S$). As material in the acidic hydrolysis reactor is mixed, some is discharged above the liquid level to strip gas before it can do so. In some embodiments, supplying nitrates from the mesophilic aerobic nitrification reactor to the acidic hydrolysis reactor inhibits the sulfur-reducing bacteria that carry out this biological function. As a result, there is significantly less $H_2S$ produced in the anaerobic environment. The low quantities of these gases expected to be produced will be vented to the atmosphere, and an open pipe can be sufficient for venting as the pressure caused by gas in the headspace of the reactor. Furthermore, if a small amount of oxygen entered the system, it would have a negligible effect on the acid production.

Material with a high VFA content is transferred from the acidic hydrolysis reactor to the anaerobic reactor for the next stage of anaerobic digestion, methane formation. In some embodiments, the material transferred to the anaerobic reactor has a VFA content of at least 1000 ppm.

Anaerobic Reactor/Environment

The material with a high VFA concentration is removed from the acidic hydrolysis reactor and transferred to the anaerobic reactor/environment. The anaerobic reactor contains methanogens, which are methane-forming archaea, that convert VFAs produced by the acidic hydrolysis reactor into a methane-rich biogas. For example, the biogas produced in the anaerobic reactor can comprise at least 60% v/v methane, alternatively at least about 70% v/v methane. Biogas production is one of the main benefits for anaerobic digestion processes making it an important factor to evaluate.

In some embodiments, operation of the acidic hydrolysis reactor is adapted to achieve one or more of the following objectives: Increased methanogen proliferation; High quantify methane production as a function of VS destruction; Temperature and pH selected to maximize or increase biogas production; High rate of conversion of VFAs from the acidic hydrolysis reactor; Maintaining desired anaerobic digestion conditions despite material being transferred from other reactors; and Reduced foam potential based upon VFA concentrations. In some embodiments, material with a high VFA content is transferred to the AD for the second stage of anaerobic digestion which includes methane formation. In some embodiments, the anaerobic reactor contains a relatively high concentration of methanogens, effectively a different microbial culture than that present in the acidic hydrolysis reactor. In some embodiments, the anaerobic reactor is seeded or supplemented with a methanogenic microbial culture. A variety of methanogens can utilize several metabolic pathways to produce methane.

The anaerobic environment preferably contains the methanogenic archaea *Methanosarcina* to produce methane. *Methanosarcina* may be the only known anaerobic methanogen to utilize all three metabolic pathways for methanogenesis; using acetate, $CO_2$, or C1 compounds as the substrates. In some embodiments, the anaerobic reactor/environment at least contains *Methanosarcina* microorganisms. In some embodiments, a high concentration of acetate entering the anaerobic reactor means the microbes will primarily use an acetoclastic pathway which converts acetate to $CH_4$, $CO_2$, and $H_2$. The presence of $CO_2$ and $H_2$ from previous stages establishes a potential to boost methane production. In some embodiments, the present processes and system are operated or adapted to favor or promote activity by *Methanosarcina*.

The methanogens in the anaerobic environment are a sensitive culture, therefore particular attention is given to their environment. Preferred conditions for *Methanosarcina* are 95° F. and pH 7.0, so the anaerobic environment is be kept as close to these conditions as possible, such as in a range of 90° F. to 100° F. and/or a pH of 6.5 to pH 7.5, or 6.7 to 7.5.

VFAs in the anaerobic environment accounts for a significant portion of the VS in the system. The formation of biogas from VFAs is favored for VS destruction in the present methods and system.

The present processes and systems can include a biogas collector that is fluidly connected to the anaerobic digestion reactor. The biogas produced in the anaerobic reactor can be measured or assessed to quantify the effectiveness of the present process and system. A conduit extending from the top of the reactor can be fitted with a flow meter and solenoid valve, and continues on to a gas collector for biogas collection. The gas collector can be a standard biogas collection unit or a weather balloon. The flow meter is effectively a means to verify the amount of gas collected in the collector. When removing the weather balloon for analysis or transferring material in or out of the anaerobic reactor, the flow meter line will be closed as the bypass line is opened. This prevents the flow meter from attempting to process backflow and avoids deviant values.

In some embodiments, the present methods and systems are operated to produce at least 10 cubic feet ($ft^3$) of biogas per pound of VS destruction, alternatively at least 12 $ft^3$/lb, alternatively 12 to 15 $ft^3$/lb.

Similar to the acidic hydrolysis reactor, the anaerobic reactor is mixed via a pump circulating liquid at the bottom of the tank. However, this pump is dedicated to mixing and does not transfer any material between tanks. The anaerobic reactor is intermittently mixed, with the mixing pump activating for a set duration. High mixing intensity in the anaerobic reactor can inhibit reproduction of the methanogens, decreasing the reactor's efficiency. Some mixing is still required to suspend material that has settled, and uniformly distribute material throughout the tank.

Thermophilic Aerobic Environment

After going through the anaerobic digestion reactors, material is transferred to a thermophilic aerobic reactor/environment. In some embodiments, the environment is an autothermal thermophilic anaerobic digester (ATAD). The ATAD operates at high temperatures (at 130° F. or higher), and it achieves pathogen destruction required for the resulting biosolids to achieve Class A classification. It utilizes thermophilic microorganisms that digest material in the presence of oxygen. The reactions being carried out by the microorganisms are exothermic (heat producing) which allows the reactor to maintain its high temperature (autothermal operation). The thermophilic aerobic environment operates at sufficiently high temperatures for thermophilic microorganisms to engage in pathogen destruction. Sufficient removal of pathogens from the material will result in a Class A biosolid. Fecal coliform, while not pathogenic itself, is an indicator of other pathogens being present, and testing for fecal coliform can be used to determine if the biosolids have been treated as expected.

The thermophilic aerobic environment can be used to further remove VS from the material, though the anaerobic environment will have converted a significant portion of the VS originally in the material to biogas.

The microorganisms present in the reactor are facultative anaerobes; meaning they can ferment compounds under aerobic conditions, while making energy in the form of ATP under anaerobic conditions. The ORP in the thermophilic aerobic reactor is monitored to determine when the addition of oxygen, as compressed air, is necessary. Aeration is carried out through an air stone or other gas distributor in the bottom of the environment. An air stone introduces an air stream consisting of very fine bubbles. Smaller bubbles present a higher surface area to allow for a better uptake of oxygen by the microorganisms present in the material. A motor-driven mixer or jet mixer is also employed to ensure a sufficient distribution of oxygen throughout the environment. In some embodiments, the thermophilic aerobic digestion environment comprises one or more aeration systems at least partially within the thermophilic aerobic digestion reactor, the mesophilic digestion reactor, or both, wherein the one or more aeration systems comprises a jet aeration device located at a bottom portion of the reactor.

Microorganisms present in the thermophilic aerobic environment are sensitive to not only temperature, but to pH as well. In some embodiments, a pH of at least 7.5 will be maintained. Having a high temperature in the thermophilic aerobic environment will facilitate the reactions occurring, increasing the rate at which they are carried out. This, in combination with the already diminished VS content, means the thermophilic aerobic environment can carry out its function with a shorter HRT.

Conditions established during operation of the thermophilic aerobic environment form a high potential for foaming to occur within the tank. This reactor will have a sight tube like those previously mentioned. However, this one will serve the dual purpose of monitoring foam being produced as well as the liquid level in the tank.

High temperatures in the thermophilic aerobic environment make it advantageous to adapt the present processes and system for waste heat recovery. In some embodiments, heat exchanging equipment is employed between one or more reactors; in some embodiments, heat transfer is accomplished by recycling material from the thermophilic aerobic environment to the acidic hydrolysis environment to heat fresh, cold material entering the process to a desired temperature.

In some embodiments, the thermophilic aerobic environment is adapted to achieve pathogen destruction necessary for Class A biosolid classification. In some embodiments, thermophilic aerobic environment is operated at an ORP, pH, and power density to provide at low HRT. In some embodiments, the method or system comprises a recycle of material from the thermophilic aerobic environment to the acidic hydrolysis environment. This may be done to dilute contents to allow higher influent solids concentration; to reduce heating requirements of biosolids inputted to the acidic hydrolysis environment; to improve anaerobic digestion; and/or to facilitate or increase one or more of biogas production, VS destruction, and pathogen destruction. In some embodiments, the maximum recycle temperature is held below a desired limit in order to avoid baking solids onto a stainless steel surface of heat exchanger through which the biosolids pass.

Mesophilic Digestion Environment/Reactor

After digestion in an ATAD or other thermophilic aerobic digestion environment, material is transferred to the mesophilic digestion environment. In some embodiments, the mesophilic digestion environment is suitable to provide nitrification/denitrification and may be a reactor designed for such (for example, a SNDR system as described in U.S. Pat. No. 8,221,627). The mixing of the digested biosolids with the oxygen-containing fluid is adjusted to promote nitrification and denitrification of the biosolids in the mesophilic digestion environment, based on the measured parameter.

In some embodiments, the mesophilic digestion environment is suitable, configured or operated to promote nitrification while inhibiting denitrification. Among the methods available for nitrification are the oxidation of ammonia in a mesophilic aerobic reactor. The air being supplied converts ammonia, $NH_4^+$, to nitrite and nitrite, $NO_2^-$ and $NO_3^-$, respectively. In some digestion processes, denitrification (the conversion of nitrate to nitrogen gas) can follow nitrification by stopping the air supply to the mesophilic reactor. Another method to achieve denitrification is to supply nitrates to an anaerobic environment. When nitrates are supplied to a mesophilic anaerobic environment denitrification occurs with the added benefit of inhibiting the activity of sulfur-reducing bacteria. These bacteria are responsible for the production of hydrogen sulfide ($H_2S$) that often accompanies anaerobic digestion and plays a significant role in odor production and equipment corrosion. This is achieved by the bacteria present having a preference to reduce nitrogen compounds in place of sulfur compounds. This is demonstrated by the following reaction:

$$HS^- + 1.6NO_3^- + 0.6H^+ \rightarrow SO_4^{2-} + 0.8N_2 + 0.8H_2O + 8e^-$$

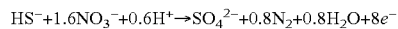

This mechanism utilizes conditions already present in anaerobic digestion environments to carry out denitrification, removing the requirement to do so in an aerobic reactor. Supplying nitrates to the anaerobic environment effectively carries out denitrification while inhibiting the sulfur-reducing bacteria so that $H_2S$ concerns are eliminated.

In some embodiments, an amount of one or more digestion byproducts in the mesophilically digested biosolids is significantly reduced in the mesophilic digestion environment. Employing mesophilic digestion environment after the preceding digestion stages surprisingly can promote further breakdown of VFAs and the main constituents of EPS still present in the biosolids, while performing its function of reducing ammonia content. For instance, it is contemplated that VFAs can be lowered by a significant percentage and/or EPS can be lowered by a significant percentage in the mesophilic digestion environment.

In some embodiments, the mesophilic digestion environment is adapted to reduce heightened ammonium concentrations created by the preceding reactors or stages; and/or increase dewatering ability of digested biosolids, thereby reducing polymer requirements.

In some embodiments, the process or system comprises a recycle or other transfer of material from the mesophilic digestion environment to the acidic hydrolysis environment. This may be done for one or more of the following objectives: provide nitrates to the acidic hydrolysis environment to inhibit sulfur-reducing bacteria to prevent the formation of $H_2S$; to reduce ammonium in the anaerobic digester so as to deter struvite formation; to reduce the pH in the anaerobic digester so as to deter struvite formation; to dilute material in the acidic hydrolysis environment as to allow higher influent solids concentration; to reduce VFA concentration in the anaerobic digester to avoid accumulation; and/or to facilitate or increase one or more of biogas production, VS destruction, and pathogen destruction.

The preceding reactors in the present process and system produce varying levels of nitrogen, in the form of ammonia ($NH_3$) and ammonium ($NH_4+$) that must be treated. In some embodiments, the mesophilic digestion reactor undergoes rapid nitrifying and denitrifying steps to achieve this final nutrient removal for the process. Nitrification involves oxidizing ammonia to nitrate ($NO_3^-$). In some embodiments, the mesophilic digestion reactor undergoes nitrification step(s), then the nitrified biosolids are recycled to the anaerobic acidic hydrolysis environment, where denitrification occurs, which reduces the nitrate back to nitrogen gas ($N_2$). The mesophilic digestion reactor can be configured or operated such that it does not undergo a denitrification step, such as by maintaining or increasing aeration of the contents in the mesophilic digestion reactor.

In some embodiments for treating biosolids, mesophilically digested biosolids are transferred to the acidic hydrolysis environment at a recycle rate of at least 60%, or at least 75%, or at least 90%, or at least 100%, or at least 120%, or at least 150%, or at least 180%, or at least 200%, though lower or higher recycle rates may be employed under some conditions, in light of the teachings of the present disclosure. In some embodiments for treating wastewater, an aerobically treated wastewater comprising nitrates is transferred to an acidic environment at a recycle rate of at least 60%, or at least 75%, or at least 90%, or at least 100%, or at least 120%, or at least 150%, or at least 180%, or at least 200%, though lower or higher recycle rates may be employed under some conditions, in light of the teachings of the present disclosure.

Similar to the thermophilic aerobic environment, the mesophilic digestion environment requires oxygen for proper operation. Atmospheric air can be introduced to the environment through the use of an air blower. The incoming air passes through an air stone, sparger, jet aeration system or other gas distributor at the bottom of the tank to form small bubbles. Another motor-driven mixer or jet mixer is on top of the mesophilic digestion environment to serve the same purpose as in the thermophilic aerobic digestion environment.

In some embodiments, cycling aerobic/anaerobic conditions of the mesophilic digestion environment produce an off-gas stream consisting primarily of $N_2$. It can be vented to the atmosphere with the off-gas produced by the acidic hydrolysis environment. In other embodiments, the mesophilic digestion environment is maintained in an aerobic condition, so that nitrites and nitrates are provided, and substantially no denitrification is performed.

In some embodiments, in the mesophilic digestion reactor, a probe is to be used for monitoring temperature, pH, and ORP conditions in the tank; in some embodiments, a single probe monitors all three parameters. In some embodiments, the mesophilic digestion reactor operates at a temperature of about 95° F. and a pH in the range of about 6.2 to about 6.6. In some embodiments, ORP is used to monitor the completion of nitrification and denitrification steps.

The mesophilic digestion reactor may be the last stage in the process of treating the biosolids before material is disposed of, distributed, or otherwise exits from the present process or system. Material that has been processed by this reactor is a high quality biosolid with low odor. Proper function of the mesophilic digestion environment also results in a product better suited for dewatering, requiring less polymer consumption. Processed material will be transferred from the mesophilic digestion environment to waste collection or recycled to the acidic hydrolysis reactor using the transfer system.

Recycle Streams

In some embodiments, the present process and system use a recycle stream. In some embodiments, material from both the thermophilic aerobic reactor and the mesophilic digestion reactor are recycled back to the acidic hydrolysis reactor.

As an initial or early stage of the process for treating material, the acidic hydrolysis reactor requires a large amount of energy to heat the fresh material to operating temperatures. Recycling material from the thermophilic and/or mesophilic digestion reactor that has passed through a heat exchanger will significantly reduce these heating requirements. Unexpectedly, the recycling of material from the mesophilic digestion reactor to the acid hydrolysis reactor can have additional benefits such as inhibiting the activity of sulfur-reducing bacteria to prevent the formation of $H_2S$ in the anaerobic environment; improving destruction of volatile solids in the anaerobic digestion reactor; balancing the VFA to alkalinity ratio in the anaerobic digestion reactor; decreasing the ammonia concentration in the anaerobic digestion reactor to reduce struvite formation; decreasing the pH in the anaerobic digestion reactor to reduce struvite formation.

Material that has been processed by the mesophilic digestion environment will have much lower concentrations of $NH_4^+$ and VFAs than any other stage of the digestion process. Recycling material from the mesophilic digestion reactor to the acidic hydrolysis reactor will dilute the acidic hydrolysis contents as well as lower the concentration of VFAs and the ratio of VFAs to the alkalinity. Diluting the VFA concentration in the acidic hydrolysis reactor will help prevent accumulation that can inhibit methane production in the anaerobic digestion reactor. Decreasing the ammonium in the anaerobic digester will lower the pH of the digester while maintaining a high level of alkalinity. Decreasing the ammonium in the anaerobic digester through the system will reduce the potential for struvite precipitation in the anaerobic digester. Maintaining a lower pH and ammonium concentration keeps struvite in a soluble for so as to prevent it from precipitating in the digester or in pipes.

Sludge coming from the thermophilic aerobic environment or mesophilic digestion environment will have low levels of solids remaining. Decreasing the concentration of VS in the acidic hydrolysis reactor will increase the amount of solids in the fresh sludge that can be successfully treated while avoiding a stressed reactor due to overload of VFA.

Design Parameters/Control Schemes

The present processes and systems provide significant improvements from traditional anaerobic digestion processes. Effectiveness of the process will strongly depend on what is controlled in the system, and how it is done. The ability to manipulate and monitor certain parameters within the system enables superior control of anaerobic digestion. In some embodiments, the present processes and systems include monitoring one or more of temperature; pH; Oxidation-Reduction Potential (ORP); Hydraulic Retention Time (HRT); Recycle Streams; or Mixing, in one or more of the treatment stages, preferably in each of the treatment stages.

The present processes and systems utilize microorganisms to biologically treat the biosolids. Maintaining a reactor at its designated temperature is desirable for managing or promoting microbial growth. Different microorganisms are sensitive to the temperatures at which they reproduce most efficiently, and are classified as such (mesophilic, thermophilic, etc.). Deviations from the design temperature in a reactor can kill off desired microbes while encouraging the growth of unwanted ones. Continuously monitoring and controlling the temperature ensure proper functionality of each reactor. Furthermore, it allows potential problems within the system to be identified before reaching critical conditions.

An exemplary treatment scheme is that the material in the acidic hydrolysis environment is maintained at about 99° F. for a period; the material in the anaerobic digestion environment is maintained at about 95° F. for a period; the material in the thermophilic aerobic digestion environment is maintained at greater than 130° F. or greater than 140° F.; and the material in the mesophilic digestion environment is maintained at about 95° F. for a period. In some embodiments, the mesophilically digested biosolids are Class A biosolids. In some embodiments, the foregoing periods are HRTs, and the processes and system comprise controlling input and output of material to each of the digestion environments to provide a hydraulic retention time (HRT) for material in each, wherein the HRT in the acidic hydrolysis environment is 1-3 days or 2-3 days, the HRT in the anaerobic digestion environment is 12-15 days, the HRT in the thermophilic aerobic digestion environment is 4-6 days, or 4 days, and the HRT in the mesophilic digestion environment is 1-10 days, or 4-10 days, or 6-10 days. In some embodiments, the treatment scheme provides mesophilically digested biosolids which are Class A biosolids.

Just like temperature, most microorganisms are preferential to certain pH values. There is no pH-based classification for microbes, but maintaining the desired value of a microorganism is essential to proper growth and functionality. The pH of a reactor is affected by the chemical constituents present in the material. Variation in the pH can indicate accumulation of VFAs, ammonia, or other components. A buildup of some compounds can severely inhibit the functionality of microbes, or lead to mechanical problems such as struvite precipitation. Struvite precipitation is a major concern in waste treatment. It primarily occurs when there are high magnesium, ammonia, and phosphorus levels at high pH values (>8.0), so control over the pH will also reduce potential for this occurrence. The importance of maintaining designated pH values makes monitoring and controlling the pH within the system a critical design parameter.

In some embodiments, the treatment scheme further comprises the acidic hydrolysis environment at a pH less than 6 or 6.5, for example 5.5; the anaerobic digestion environment at a pH of 6.5 to 7.5 or 6.7 to 7.4; the thermophilic aerobic digestion environment at a pH of greater than 7.5; and the mesophilic digestion environment at a pH of 6.0 to 6.8 or 6.2 to 6.6. The pH scheme can be combined with a temperature scheme, HRT scheme, and/or other schemes disclosed herein.

ORP is a measure of the readiness of a substance to lose an electron (oxidation) or gain an electron (reduction). Variations in a reactor's ORP designate the mechanism used by microorganisms or their desire to uptake oxygen to digest material, and the material actually being digested. Therefore, monitoring the ORP gives insight to the chemical state of the reactor. The ORP in the aerobic reactors is used to signal when the addition of oxygen as compressed air.

The present processes and system utilizes recycle streams from the thermophilic aerobic digestion reactor and mesophilic digestion reactor back to the acidic hydrolysis reactor. Material in the thermophilic aerobic digestion reactor is much hotter than the acidic hydrolysis reactor and has undergone significant VS destruction. Material in the mesophilic digestion reactor will have much lower ammonia and VFA concentrations, and has undergone even more VS destruction. Recycling material from these reactors will dilute the contents of the acidic hydrolysis reactor, increasing the maximum solids loading of fresh material that can be processed. Varying the amounts being recycled by each reactor will demonstrate the effects of each on both acidic hydrolysis reactor and overall performance. The ability to adjust the amount of material being recycled from each reactor enables the system to achieve superior performance.

In some embodiments, chemical demand to obtain coagulation and flocculation of digested biosolids may also decrease. Coagulation is a preliminary step before flocculation can occur. In activated sludge digestion processes, coagulation occurs naturally, so a two part chemical program is traditionally not required. However, when cell lysis is employed, such as in the thermophilic aerobic digestion reactor, charge neutralization becomes necessary. The use of metal salt additives, such as ferric sulphate, precipitates phosphate ions and as the pH of the medium is lowered, acidic components in the medium neutralize negatively charged biopolymers that were released during cell lysis and not broken down across the system. After material is charge-neutralized, it coagulates more readily, coagulated material can be flocculated with conventional flocculation polymers. In some embodiments, a fully mesophilic system without a thermophilic reactor will remove the requirement for a coagulant altogether before flocculating the biosolids.

Lowering these flocculation polymers in the thermophilic digestion environment will also lower them in the mesophilic digestion environment, and this acts as a biological pre-conditioning step before dewatering. In effect, the present processes and system reduce the dewatering chemical demand by removing compounds that inhibit coagulation, as a consequence of lowering the pH across the system and increasing the recycle rate. The polymers will form a tighter bond with lower charge potential therefore reducing the polymer amount required for flocculation. A strong floc with a low VS: high inert ratio increases cake porosity that improves free water flow while allowing higher pressures in the centrifuge to improve hydraulic throughput and cake solids.

It has been observed that a stressed condition may occur for the culture in a treatment environment. One instance where this may occur is where the anaerobic digestion environment is VFA overloaded. The stressed condition can eventually spread throughout the entire treatment system one step at a time, as evidenced by the reactors foaming, inefficient O2 transfer, high ammonium, high pH, high VFAs, and/or lower-than-normal VS destruction. A stressed condition can then transfer higher than normal volatile solids to the thermophilic or mesophilic digestion environments which follows the anaerobic digestion. The stressed condition can also cause pH changes and other undesirable conditions.

When digested biosolids from the thermophilic aerobic digestion reactor and/or mesophilic digestion environment are recycled to the acidic hydrolysis environment, a stressed condition can be reduced, eliminated or prevented. Where a stressed condition already exists, recycling will improve the treatment environment and the microorganism culture will move into a proper mode, effectively recovering the stressed digestion environment.

Figure 2:
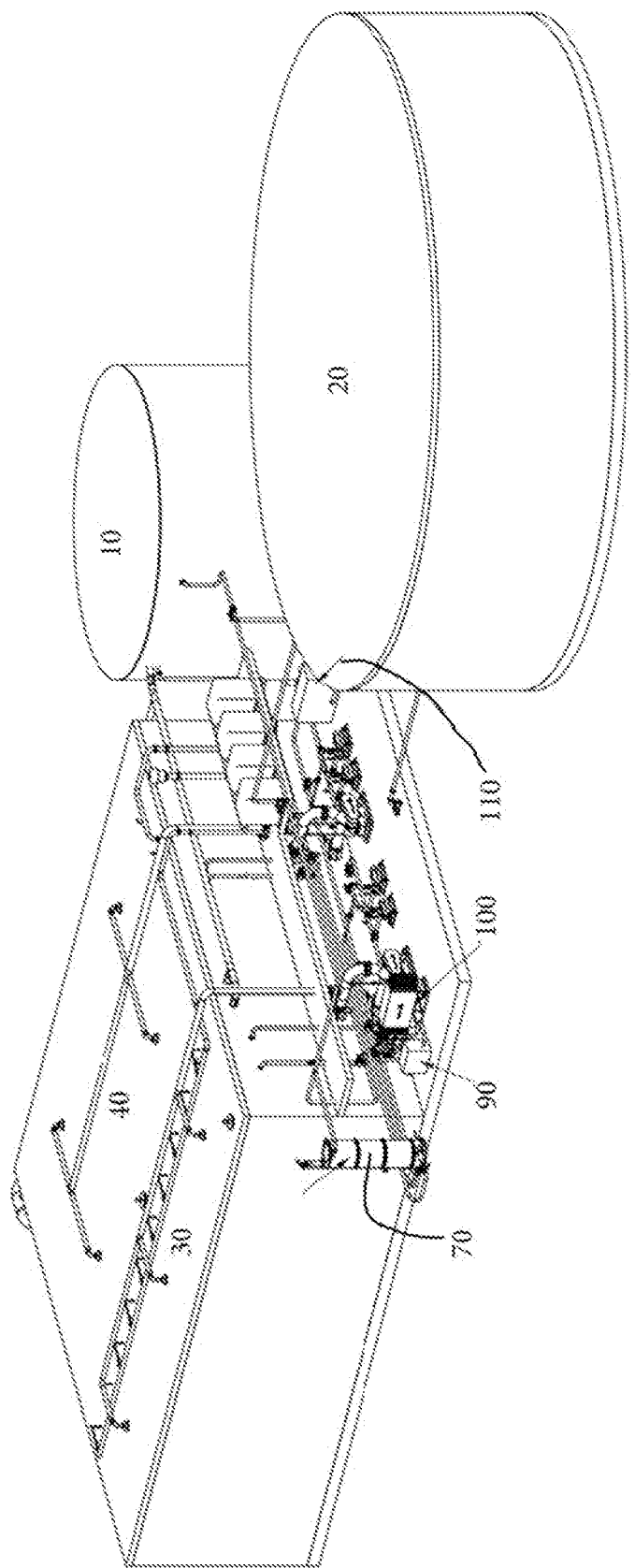
FIG. 2 is an isometric view of an embodiment of the present processes and system.

FIG. 1 is a system plan for an embodiment of the present processes and system, and FIG. 2 is an isometric view of the same embodiment. Material for treatment (e.g., biosolids from a wastewater treatment process) is introduced to an acidic hydrolysis reactor 10. The biosolids undergo anaerobic treatment that predominantly includes hydrolysis and VFA fermentation. After a suitable acidic hydrolysis period, material is transferred to an anaerobic digestion reactor 20. The biosolids undergo anaerobic digestion that predominantly includes conversion of VFAs into a methane-rich biogas. For example, the biogas produced in the anaerobic reactor can comprise at least 60% v/v methane, alternatively at least about 70% v/v methane. After a suitable anaerobic digestion period, material is transferred to a thermophilic digestion reactor 30. The thermophilic aerobic digestion reactor operates at high temperatures (for example, at 140° F. or higher), and it achieves pathogen destruction required. In some embodiments, the rector is operated so that the resulting biosolids achieve Class A classification. Thermophilic microorganisms that digest material in the presence of oxygen. In some embodiments, the amount of fecal coliform is determined before material is released from the thermophilic aerobic reactor. After a suitable thermophilic aerobic digestion period, material is transferred to a mesophilic digestion reactor 40. In the mesophilic digestion reactor 40, ammonium concentrations in the material are reduced by cycling between aerobic and anaerobic conditions. After a suitable mesophilic digestion period, material is taken for disposal or further treatment.

The system also comprises a biofilter 50 and a scrubber 60 which receives off-gas. Off-gas from the mesophilic digestion reactor and/or other reactors leaves through off-gas piping and is further processed through a scrubber 60 and/or biofilter 50. Scrubbers are commonly used to reduce odors from off-gases. Suitable scrubbers include particulate scrubbers as well as adsorption towers which are widely used in the chemical and metal working industries. Biofilters use naturally occurring bacteria to oxidize the odor constituents into products like carbon dioxide and water. Biofilters are commonly used by wastewater treatment plants to reduce odors.

A heat exchanger 70 is provided to receive heat from the thermophilically digested biosolids and transfer the heat to a stream of material being introduced to another reactor, such as the acidic hydrolysis reactor or the mesophilic digestion reactor. An equipment building 80, a boiler 90, and a cooler 100 are also shown. A thickener 110 receives material from the mesophilic digestion reactor 40 and removes water from the material.

A pH sensor, temperature sensor, an ORP probe, and/or another sensor or probe can be provided in the thermophilic digestion reactor 30 to measure a parameter in the digested biosolids. For example, a pH sensor may be used to increase, decrease or stop recycle from a mesophilic reactor to a thermophilic reactor.

A transfer conduit from the mesophilic digestion reactor 40 to the acidic hydrolysis reactor 10 is configured to transit material from the former the latter. The recycled material was approximately one-third of the total material introduced to the acidic hydrolysis reactor 10.

The present processes and system may also be employed to induce additional total solids (TS) and volatile solids (VS) destruction in the digested biosolids. VS reduction as high as about 10-15% has been observed with proper control over aeration, mixing, temperature, foam and pH. Additional VS destruction reduces oxidative demand and soluble COD fraction and translates into lower odor potential and vector attraction in the digested biosolids.

In some embodiments, a recycle conduit is configured to transfer material to the acidic hydrolysis reactor from one or both of the acidification tank and the precipitation tank of the phosphorus recovery system described herein, so as to provide increased acidity.

The present system can also include one or more controllers operatively connected to other parts of the system. For instance, a controller can be operatively connected to one or more sensors and to a recycle conduit, and the controller can be adapted for adjusting recycle of material from the mesophilic digestion reactor and/or the thermophilic reactor to the acidic hydrolysis reactor based upon input from one or more of the sensors. The system can include one or more sensors in signal communication with the controller and adapted to measure pH, alkalinity, temperature, solids content, VFA concentration, or other parameter, in one or more of the digestion reactors. A controller can be in signal communication with each of the digestion reactors, wherein the controller is configured to control input and output of material to each of the digestion reactors to provide a hydraulic retention time (HRT) for material.

In some embodiments of the foregoing processes, from 50% to 150%, alternatively from 75% to 125% (based upon the daily feed volume) of the mesophilically digested biosolids can be recycled. In some embodiments, the amount of recycled mesophilically digested biosolids is sufficient to increase efficiency of thermophilic digestion, for example, by at least 10-20% as reflected by lower energy input, for example lower oxygen supply while maintaining ORP, or higher ORP with the same oxygen supply. In some embodiments, the amount of recycled mesophilically digested biosolids is sufficient to lower VFAs and/or lower VFA to ALK ratio in the acidic hydrolysis environment. In some embodiments, the mesophilic digestion environment or reactor comprises methanogenic bacteria, and the process further comprises the step of recycling methanogenic bacteria to the acidic hydrolysis environment or reactor.

In some embodiments, the processes further comprise adjusting the mixing of the digested biosolids with the oxygen-containing fluid to promote nitrification and denitrification of the biosolids in the mesophilic digestion environment, based on the measured parameter; and reducing an amount of one or more digestion byproducts in the mesophilically digested biosolids. In some embodiments of the foregoing systems, the mesophilic reactor is adapted for alternating nitrification and denitrification of digested biosolids.

In some embodiments, the processes also comprise the step of dewatering the mesophilically digested biosolids.

In some embodiments, the system further comprises one or more sensors adapted to measure one or more parameters of contents of the acidic hydrolysis reactor, anaerobic reactor, thermophilic reactor, and/or mesophilic reactor, or two or more of those reactors. The sensors can be adapted to measure one or more of those parameters are selected from the group consisting of pH, alkalinity, ammonia, VFAs, VFA to ALK ratio, sCOD, temperature, or another parameter, and combinations thereof. In some embodiments, the system also comprises a controller operatively connected to one or more sensors and to the recycle conduit, and the controller is adapted for adjusting recycle of mesophilically digested biosolids from the mesophilic reactor to the acidic hydrolysis reactor based upon input from one or more of the sensors. For example, in some embodiments, the foregoing system comprises one or more sensors are adapted to measure pH and temperature, and those one or more sensors are operatively connected to provide a pH signal and a temperature signal to the controller, and the controller is adapted for adjusting the recycle based upon the pH signal and the temperature signal.

In some embodiments of the foregoing system, the system further comprises one or more aeration systems at least partially within the thermophilic digestion reactor, the mesophilic digestion reactor, or both. The one or more aeration systems can comprise a sparger, a jet aeration device located at a bottom portion of the reactor.

The present methods and system can accomplish one or more of the following objects: produce a Class A biosolid and high quality cake with low odor; provide a thermal balance that reduces or minimizes heating requirements in anaerobic stages of the treatment process using waste heat recovery from the thermophilic aerobic digestion reactor; increase or maximize VS destruction in the anaerobic digestion environment and minimize VS destruction in the thermophilic aerobic digestion environment; provide better environments for different microorganisms in different stages of the process; decrease overall HRT for the anaerobic digestion process with improved VS destruction and biogas production; implement process control parameters to balance VFA production in the acidic hydrolysis reactor and conversion in the AD; decrease ammonia concentration in the anaerobic digestion reactor to reduce the potential for struvite formation; decrease pH in the anaerobic digestion reactor to reduce the potential for struvite formation; decrease N and P concentrations being recycled; and/or employ a maximum solids loading.

The present methods and system can have one or more of the following advantages:
(a) Higher throughput within a given size for a reactor or a system, including Increased rated capacity with minimal tankage expansion, improved biological efficiency so as to permit shorter HRT;
(b) Cell lysis in the thermophilic aerobic digestion reactor, Return of soluble material after cell lyses to the acid phase reactor, Class A Biosolids qualification for pathogen kill and vector attraction, Increased gas yield, Increased VS destruction, Biologically breaks down extracellular polymeric substances (EPS) that inhibit dewatering efficiency;
(c) Promotion of four diverse biological cultures during the processes, Mesophilic anaerobic acid phase, Mesophilic anaerobic digestion, Thermophilic aerobic digestion, Mesophilic digestion;
(d) Biological separation Improves process energy efficiency, Improved process efficiency, Improved energy balance, Decreased fluid viscosity, Increased water production;
(e) Recycle of liquor from the thermophilic aerobic digestion reactor and/or the mesophilic digestion reactor to the acidic hydrolysis reactor, Direct heating of feed material via thermophilic aerobic digestion reactor or mesophilic digestion reactor recycle, Reduces fouling on heat exchange surface, Dilutes feed while reducing viscosity, Aerobic process strips $H_2S$ before returning liquor to the first biological step, mesophilic digestion reactor recycle provides process control to balance VFA concentration before entering the anaerobic digestion reactor, mesophilic digestion reactor recycle provides process control to reduce ammonia toxicity in the anaerobic digestion reactor, mesophilic digestion reactor reduces ammonia concentration and pH in the anaerobic digestion reactor to reduce the potential for struvite formation;
(f) Recuperative thickening separates HRT from SRT (solids retention time), Removes excess water, Decreases HRT, Increases SRT, Increases mass loading rate throughput;
(g) Improved heat transfer, Hydrolysis followed by digestion breaks down organic compounds that adhere to heat exchange surfaces reducing unit fouling, Spiral sludge to sludge heat exchanger returns heat to acid phase of anaerobic digester, Biological heat gain thru aeration in the thermophilic aerobic digestion reactor, Automatic heat exchanger cleaning cycle to remove hardness precipitate by using low pH mesophilic digestion reactor liquor recycle;
(h) Improved methane, Higher gas volume generated per mass of VS destroyed, Higher gas quality with lower CO2, H2 & H2S;
(i) Improved mass destruction, Each culture targets specific organic compounds, VS destruction estimated at >70% removal;
(j) Low recycle constituents to head works, High ammonia removal in the mesophilic digestion reactor, High BOD/COD removal across system, The mesophilic digestion reactor pre-conditions biosolids for coagulation/flocculation by improving valance electron ratio;
(k) Exceptional quality biosolids, Good dewatering characteristics, High cake solids, Reduced or eliminated coagulant consumption, Low polymer consumption, Large volume reduction.

The same biological functions described previously may be applied not only to the sludge digestion aspect of a wastewater treatment plant but also to the water treatment. Many facilities traditionally use aeration basins in the headworks of a plant to prevent the formation of $H_2S$ throughout the system. The energy demand for these aeration systems contribute a significant portion to the total energy requirements for a wastewater treatment plant. The process described herein produces a cheap, naturally occurring source of nitrates that not only oxidize incoming sulfur compounds, but also inhibit the growth kinetics of sulfur-reducing bacteria that form $H_2S$. The ability to provide a significant amount of nitrates further upstream has vast implications that may include, and are not limited to:

(a) Elimination of H$_2$S in pipes throughout the entire facility eliminates concerns over corrosion and related maintenance, odor, toxicity, and flammability;
(b) Reduction of aeration requirements by 70-80% via availability of oxygen in nitrates being supplied;
(c) Reduction of sludge yield by reducing BOD and COD;
(d) Increasing capacity of digestion process by reducing sludge yield.

Figure X demonstrates a proposed general layout for this process to effectively operate in conjunction with the aforementioned digestion process to improve all aspects of operations at a wastewater treatment plant.

Phosphorus Recovery Methods and Systems

The present phosphorus recovery methods and systems allow a wastewater treatment facility to reduce the amount of phosphorus leaving the facility in the effluent discharge and dewatered biosolids, and to recover the phosphorus as a chemical precipitate with potential commercial value. These methods and systems also decrease the chemical consumption for dewatering digested biosolids.

The present phosphorus recovery methods and systems reclaim a greater amount of the total phosphorus in the system while decreasing the chemical consumption for the dewatering of biosolids. In some embodiments, this method or system includes biological nutrient removal, hydrolysis, nitrification and denitrification accompanied by alkalinity reduction during digestion to condition the material before targeting phosphorus recovery The present phosphorus recovery methods and systems remove a high percentage of the total phosphorus from the waste stream. This avoids or reduces the addition of phosphorus to soil as a result of the land application of biosolids, establishing a healthier nutrient balance that will not pose the same risks of leaching and algae growth seen in much of today's land applied biosolids. In some embodiments, the methods and systems utilize Biological Nutrient Removal (BNR) technologies to uptake phosphorus into cells before digestion. There are multiple digestion methods that can be utilized, but it is important the biosolids be effectively treated for volatile solids (VS) and chemical oxygen demand (COD) removal followed by nitrification and denitrification, or nitrification alone, to lower the ammonia and alkalinity (achievable through the SNDR or mesophilic aerobic reactor) for a cleaner chemistry. Incorporation of SNDR or other nitrifying technology directly improves the cost-effectiveness of the present methods and systems.

In general, the conditioned biosolids will be prepared by digestion method in some manner prior to phosphorus recovery, although it is contemplated that the phosphorus recovery methods and systems can have utility apart from any digestion process. The conditioned biosolids can digested by any suitable method, but it is advantage to use a method that comprises at least the following characteristics: Biological Nutrient Removal for cells to uptake large amounts of phosphorus; Hydrolysis to rupture cells, releasing soluble phosphorus; and Nitrification and denitrification to reduce ammonia and alkalinity.

One of the primary benefits of the present methods and systems comes from the conditioning of the material through established wastewater technologies (BNR, hydrolysis, and nitrification/denitrification) in a manner that reduces alkalinity of the material). Treating the material in such a way establishes ideal conditions for a large amount of the total phosphorus to be removed and reclaimed from the system. Cells readily uptake large amounts of phosphorus in the BNR process, and that phosphorus is released in a soluble form when the cells are lysed through hydrolysis. Finishing digestion of the material with a nitrification and denitrification step reduces alkalinity, allowing for a cleaner chemistry with fewer interfering substances and reactions.

After the digestion and usually prior to dewatering, the pH of the thermophilically digested biosolids slurry is lowered to 4 or lower, alternatively to 3 or lower, alternatively to about 2.5 by the addition of an acid. The lowered pH further hydrolyzes the material, rupturing cells, while killing pathogens and releasing additional soluble phosphorus. The pathogen destruction achieved by acidifying material in the biosolids slurry opens a new route to achieving Class A biosolids, a route made practical by prior and subsequent steps performed on the material.

Decreasing the alkalinity of the digested biosolids material prior to the phosphorus recovery process is beneficial as there is less of an alkalinity buffer, so the amount of acid added to reach the desired pH is reduced. The low pH in the acidification tank also hydrolyzes volatile fatty acids (VFAs), reducing odor potential of the biosolids. After the material leaves the acidification tank, dilution water may be added to wash out additional phosphorus, and this wash out can be promoted by mixing, such as with a static inline mixer. A strong base is also added to the material to bring the pH of the material to a level that is not harmful to dewatering equipment. The dewatered cake from the dewatering equipment can be formed with significantly lower polymer doses and discharged with reduced phosphorus and ammonia, yielding a more nutrient-balanced solid material and a phosphorus-rich liquid.

After the liquid-solid separation, phosphorus-rich centrate biosolids stream is transferred to a precipitation tank and further treated to form a phosphorus-rich precipitate. The precipitate may be or comprise struvite (magnesium, ammonium and phosphate), brushite (calcium and phosphate), or other minerals such as phosphorus precipitates. The material in the precipitation tank is raised to a pH above 7, or above 8 or 9, with sodium hydroxide and adding a metal source, such as a magnesium source. Some metals are solubilized at a pH of about 2.5, so facilities with a high magnesium concentration will have a lower magnesium demand. Metals being solubilized also results in lower metal concentrations in the digested biosolids leaving the facility. The overall result is a lower-odor cake (digested biosolids) with significantly lower phosphorus and metal concentrations being formed at lowered chemical costs, while the phosphorus-rich liquid stream is treated to remove and recover phosphorus in a precipitate form that can be sold as a fertilizer product or other form of supplemental phosphorus.

Figure 3:
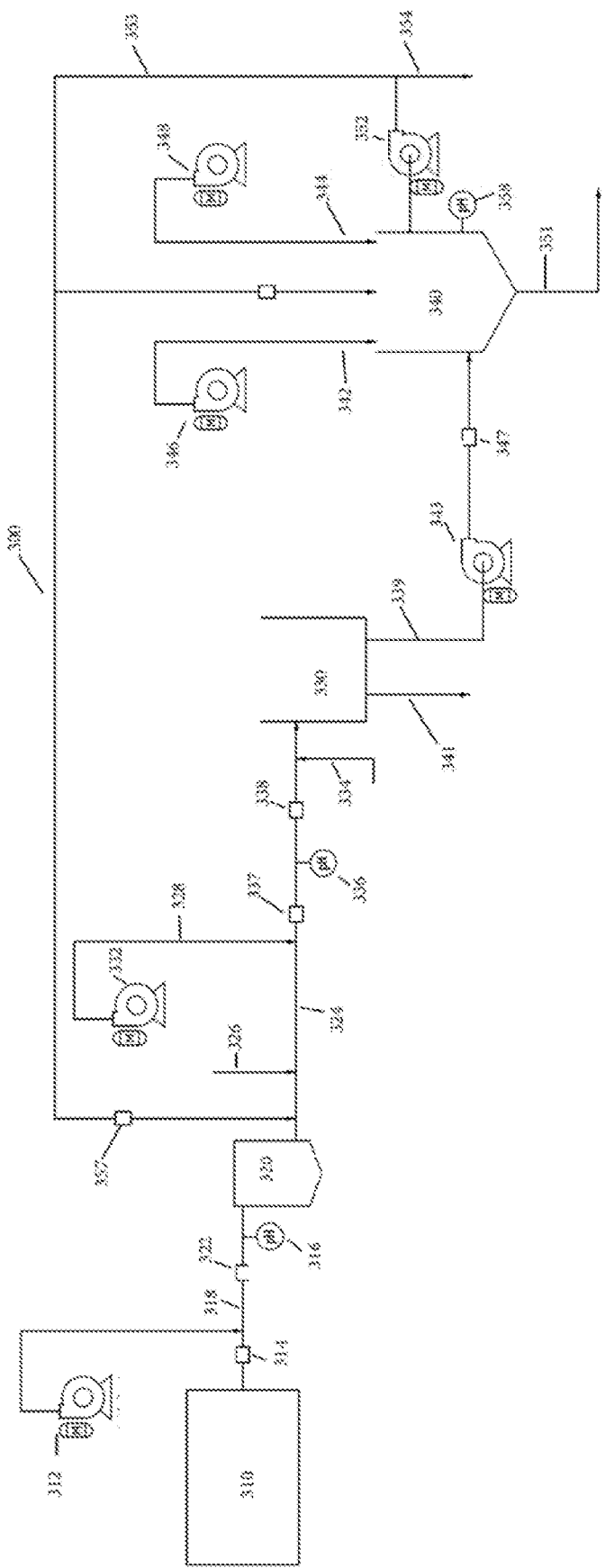
FIG. 3 is a schematic view of another embodiment.

FIG. 3 shows an exemplary embodiment of the present systems and methods for recovering phosphorus. A biosolids slurry from wastewater treatment is provided to an acidification tank 320. A slurry comprising digested biosolids is provided. In some embodiments, the slurry has a pH of between 6 and 7; in some embodiments, it is provided from an SNDR 310 or other mesophilic digestion reactor. The material from the SNDR has a relatively low alkalinity as a result of the nitrification/denitrification treatment. The material also has undergone BNR, which includes phosphorus uptake by microorganisms. The material has a suitable solids content, for example approximately 2.25% wt/vol. In the acidification tank, an acid is added to the slurry to lower the pH of the material to 4 or lower, or 3 or lower, or 2.5. Suitable acids include sulfuric, hydrochloric, and other strong acids. Acid may be provided from an acid source, which can be a pump fluidly connected to a vessel containing sulfuric acid. The system can include a flow meter 314 for measuring and/or controlling the amount of conditioned biosolids material transferred from the SNDR 310 to the acidification tank 320. A pH meter 316 can also be disposed along the transfer conduit 318, which can include a static inline mixer 322. The material can be held in the acidification tank at the lowered pH for an acidification period (the period can be an average residence time in a reactor). In the acidification tank, phosphorus is released from cells (as a result of cell lysis) and separated from solids (as a result of higher solubility in the acidic environment). The acidification period and other parameters such as pH can be selected to achieve one or more of these objectives to a desired degree.

After the acidification period, the acidified biosolids are is transferred via another conduit 324 to a separation tank 330. Any suitable separation or dewatering equipment can be used as the separation tank, including a centrifuge. In the separation tank 330, phosphorus-rich centrate biosolids (a liquid portion) are produced by separating those centrate biosolids from dewatered digested phosphorus-lean DDPL biosolids (a solid portion) in the acidified biosolids. Conduit 324 can also have a water inlet 326 through which process water can be added to dilute the acidified biosolids material. Conduit 324 can also have a base inlet 328 connected to a base source 332 which can be a pump fluidly connected to a vessel containing sodium hydroxide or other base. Before separation/dewatering, it is desirable to raise the pH to a desired level to avoid damage to the separation tank. The pH can be raised by addition of a strong base, but not raise so high as to cause significant precipitation of phosphorus. Conduit 324 can also include a polymer inlet 334 connected to a source of dewatering polymer. The pH of the material is adjusted to 4 or higher, either within the separation tank or by adding a base to a transfer conduit between the separation tank and the precipitation tank. The transfer conduit can comprise a static inline mixer 337, a pH meter 336, a flow meter 338, and other components. In some embodiments, the pH of the acidified biosolids is already at 4 or higher before entering the separation tank 330.

From the separation tank 330, the phosphorus-rich centrate biosolids is transferred via conduit 339 to a precipitation tank 340 (also referred to as a crystallizer). A pump 343 provides motive force through a static mixer 347. A dewatered digested phosphorus-lean DDPL biosolids is recovered from the separation tank 330 through solids outlet 341.

In the precipitation tank 340, a strong base is combined with the liquid portion and the pH is raised to 7 or higher, alternatively 8 or higher, alternatively 9 or higher, alternatively 10 or lower, alternatively from 8 to 10, alternatively 9.5. The conditions in the precipitation tank 340 (or in the slurry contained therein) are adjusted or maintained to promote or cause precipitation (preferably, crystallization) of phosphorus, preferably as struvite. In some embodiments, fine precipitate crystals are formed that can be gravity filtered and recovered. In this way, a phosphorus-rich precipitate from the centrate biosolids is recovered, and a phosphorus-lean effluent centrate biosolids is removed. The precipitation tank 340 can have one or more inlets and outlets, such as an inlet for base 342 and/or an inlet for metal salts 344. A source of calcium or magnesium may be added to the precipitation tank to promote the formation of brushite or struvite, respectively. Wastewaters that have high metal concentrations may not need a supplemental source of metal ions. The precipitation tank 340 can also have outlets for precipitates 351 such as struvite crystals, and for a phosphorus-lean effluent. The system can include a base source 346 which can be a pump fluidly connected to a vessel containing a sodium hydroxide solution. The system can also include a metal salt source 348 (which can be a pump fluidly connected to a vessel(s) containing one or more metal salts, such as magnesium or calcium salts).

Liquid may be withdrawn from the precipitation tank 340 by operation of pump 352 and can be transferred by conduits 353 back to conduit 342 (passing through flow meter 357) and/or through conduit 354 to headworks or return. A pH meter 358 can measure pH of the withdrawn liquid.

An advantage of the present phosphorus recovery system over other phosphorus recovery systems lies in the recovery of phosphorus before dewatering, while the phosphorus is still in the biosolids. The present system is more successful because it targets the phosphorus for precipitation in the liquid filtrate after the solids have been removed, making for a cleaner chemistry. This process is successful in reducing the phosphorus in the biosolids, and retaining it in the filtrate.

Another advantage of the present phosphorus recovery methods and systems over existing ones is that they have reduced chemical costs because they avoid expensive coagulants such as ferric sulfate and alum, while reducing the amount of polymer required.

Figure 19:
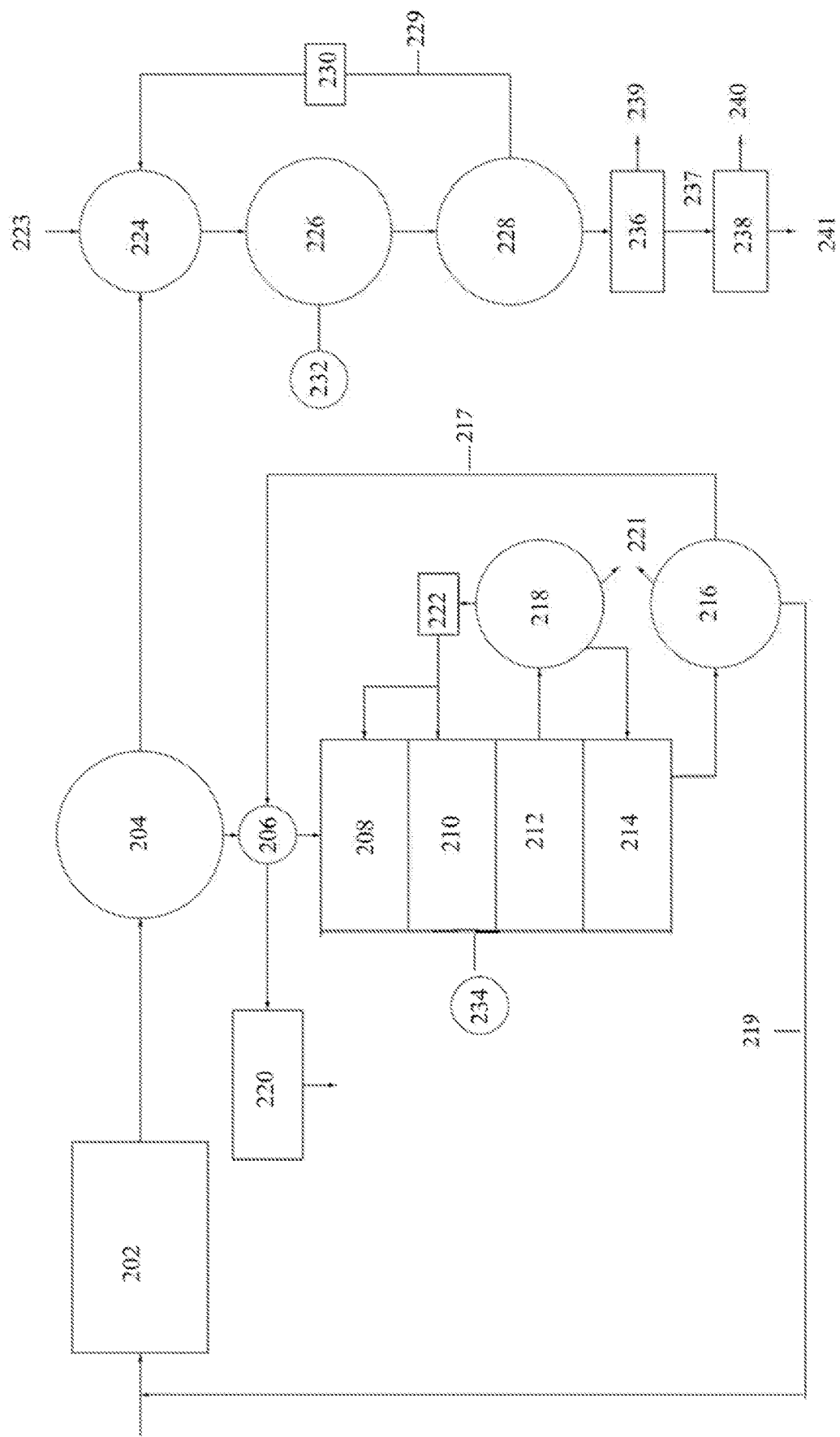
FIG. 19 illustrates another embodiment of the present processes and system.

FIG. 19 illustrates another embodiment of the present systems and methods, including subsystems for wastewater treatment, biosolids treatment, and phosphorous recovery that are advantageous alone or as part of a combined system. In FIG. 19, wastewater is fed into headworks 202 and transferred to a primary clarifier 204. The wastewater passes through a heat exchanger 206 and is fed to an acidic reactor 208, which has a pH between 5 and 6. The wastewater resides in the acidic reactor 208 for a sufficient time to produce acidified wastewater. Acidified wastewater is transferred to an anaerobic reactor 210, where it resides for a sufficient time to produce anaerobically treated wastewater. Anaerobically treated wastewater is transferred to an BOD/COD removal reactor 212 to produce BOD/COD reduced wastewater. BOD/COD reduced wastewater is transferred to an aerobic reactor 214 to produce aerobically treated wastewater comprising nitrates at a desired concentration. Aerobically treated wastewater is recycled to the acidic reactor 208 in an amount sufficient to supply the nitrates from the aerobic environment to the acidic environment in an amount sufficient to inhibit activity of sulfate-reducing bacteria. The recycled aerobically treated wastewater is optionally passed through a secondary clarifier 216 and heat exchanger 206 before it is fed to the acidic reactor 208. Material from heat exchanger 206 can be passed to a disinfection unit 220 and discharged. Aerobically treated wastewater from secondary clarifier 216 can also be recycled to headworks 202 and to primary clarifier 204. The system includes one or more recycle conduits 217, 219. Liquid material from secondary clarifier 218 can be passed to a boiler 222 and recycled to acidic reactor 208 and/or anaerobic reactor 210. The system also includes another secondary clarifier 218 which receives wastewater from anaerobic reactor 210 and allows solids to settle, and transfers wastewater to BOD/COD removal reactor 212. Solid material from secondary clarifiers 216, 218 can be removed and used as waste activated sludge (WAS) 221 in a biosolids treatment process or system.

In the embodiment shown in FIG. 19, sludge from primary clarifier 204 is fed to an acidic hydrolysis reactor 224 which provides an environment having a pH between 5 and 6. Insoluble organic polymers in the sludge are hydrolyzed to produce hydrolyzed biosolids and volatile fatty acids (VFAs). Thickened waste activated sludge (WAS) 223 can also be supplied to the acidic hydrolysis reactor 224. Hydrolyzed biosolids are transferred to an anaerobic digestion reactor 226 fluidly connected to the acidic hydrolysis reactor. The anaerobic digestion reactor 226 is adapted for maintaining an anaerobic environment to produce anaerobically digested biosolids. A mesophilic digestion reactor 228 is fluidly connected to the anaerobic reactor 226 so as to receive the anaerobically digested biosolids. The mesophilic digestion reactor 228 is adapted for and/or provides an environment for nitrification of the digested biosolids to produce mesophilically digested biosolids having a high concentration of nitrates. A recycle conduit 229 fluidically connects the mesophilic digestion reactor 228 and the acidic hydrolysis reactor 224, optionally passing through a boiler 230 or a heat exchanger.

The system can comprise one or more biogas collectors 232, 234. Biogas collector 232 is adapted to receive biogas produced in anaerobic digestion reactor 226 by fermenting of hydrolyzed biosolids. Biogas collector 234 is adapted to receive biogas produced in anaerobic reactor 210 by anaerobic treatment of wastewater. In some embodiments, the collected biogas is a sweet gas, and/or comprises less than 4 ppm of hydrogen sulfide.

The system can also comprise one or more components to facilitate separation or removal of phosphorus from conditioned biosolids. In FIG. 19, the system comprises a dewatering tank 236 which is adapted to separate the biosolids into a phosphorus-rich centrate 237 and a dewatered digested phosphorus-lean biosolids 239. The system also comprises a precipitation tank 238 fluidly connected to the dewatering tank 236. The precipitation tank 238 receives the phosphorus-rich centrate 237, and a phosphorus-rich precipitate 240 is recovered from the centrate biosolids, and a phosphorus-lean effluent 241 is removed from the precipitation tank 238.

The present systems and methods can be employed to control $H_2S$ in a sewer pipe, in plant headworks, and throughout a wastewater treatment system. Sulfide-reducing bacteria are a significant problem for sewer systems across the world. Current methods of controlling such bacteria include adding ferric salts or calcium nitrate. The present systems and methods can comprise feeding a wastewater rich in nitrates, or a solidified component of such wastewater, to a sewer, a plant headworks, or other environment containing sulfide-reducing bacteria. The aerobically treated wastewater, or a solidified component thereof, is fed in an amount sufficient to supply the nitrates in an amount sufficient to inhibit activity of sulfate-reducing bacteria. In such embodiments, it may be desirable to prevent denitrification of the wastewater or solidified component prior to feeding it into the sewer or other environment. they will become ineffective. The present systems and methods can comprise dewatering the aerobically treated wastewater to produce a cake, and transporting the cake to a remote lift station for metering the cake into the sewer piping or other environment. An alternative is to transport untreated or partially treated wastewater (such as anaerobically treated wastewater or a BOD/COD reduced wastewater) to a site at or near a lift station and aerobically treat the wastewater at that site, followed by feeding to a sewer. Another alternative is to transport a wastewater rich in nitrates or solidified component thereof to a desired feed point (such as a sewer or lift station), wherein the transportation includes with an aeration device (for example, a truck fitted with an air diffuser) to prevent denitrification. Yet another alternative is a pipe inside a sewer line through which a nitrate-rich material is pumped.

EXAMPLES

Example 1

Figure 10:
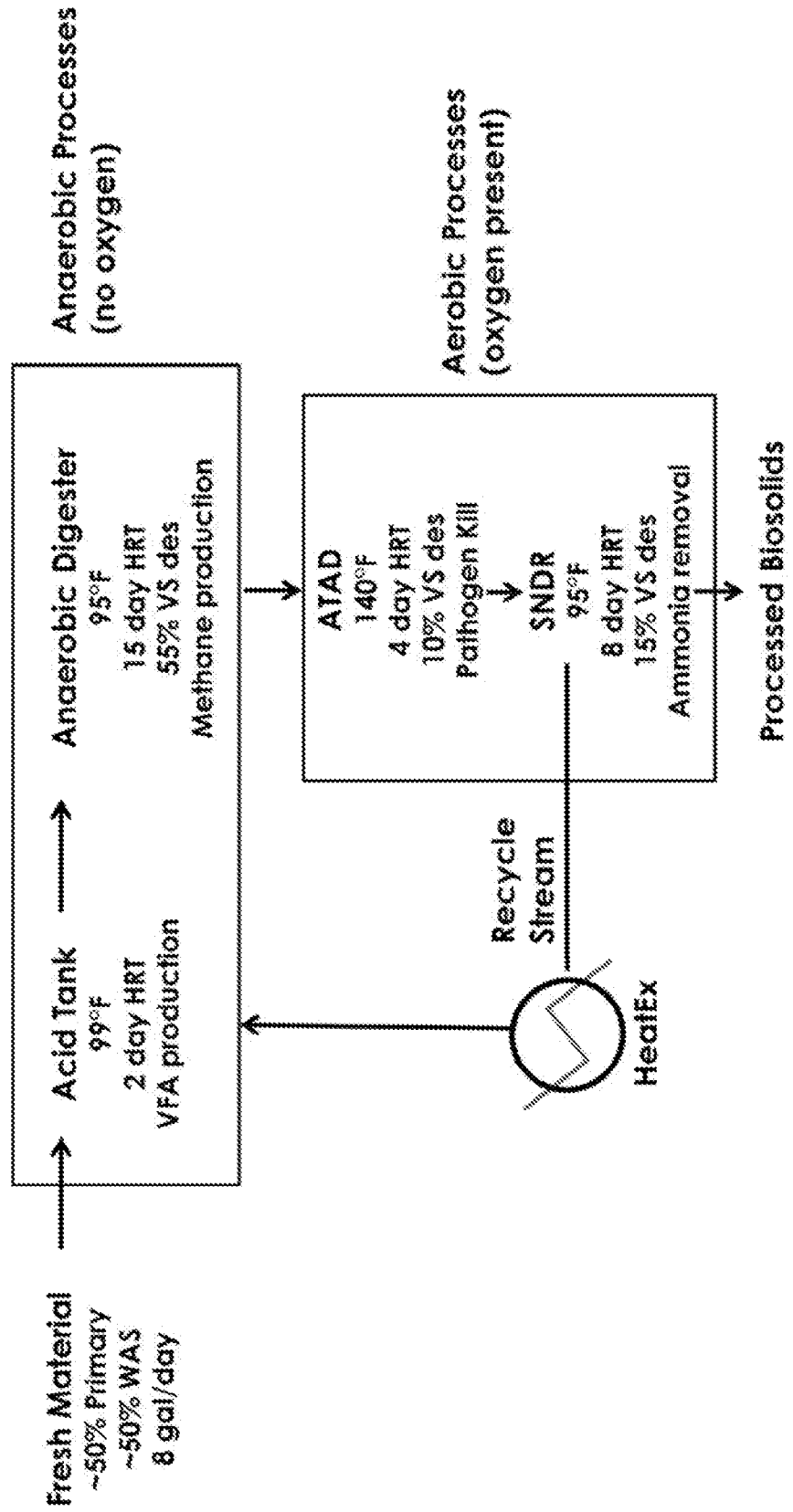
FIG. 10 illustrates an experimental system used in Example 1.

In this example, an experimental biosolids digestion system is employed. The system comprises an acidic hydrolysis reactor, an anaerobic reactor, a thermophilic aerobic digestion reactor, and a mesophilic digestion reactor. The system is generally illustrated in FIG. 10. Among other features, it includes a transfer of material from the SNDR to the acidic hydrolysis reactor.

Figure 4:
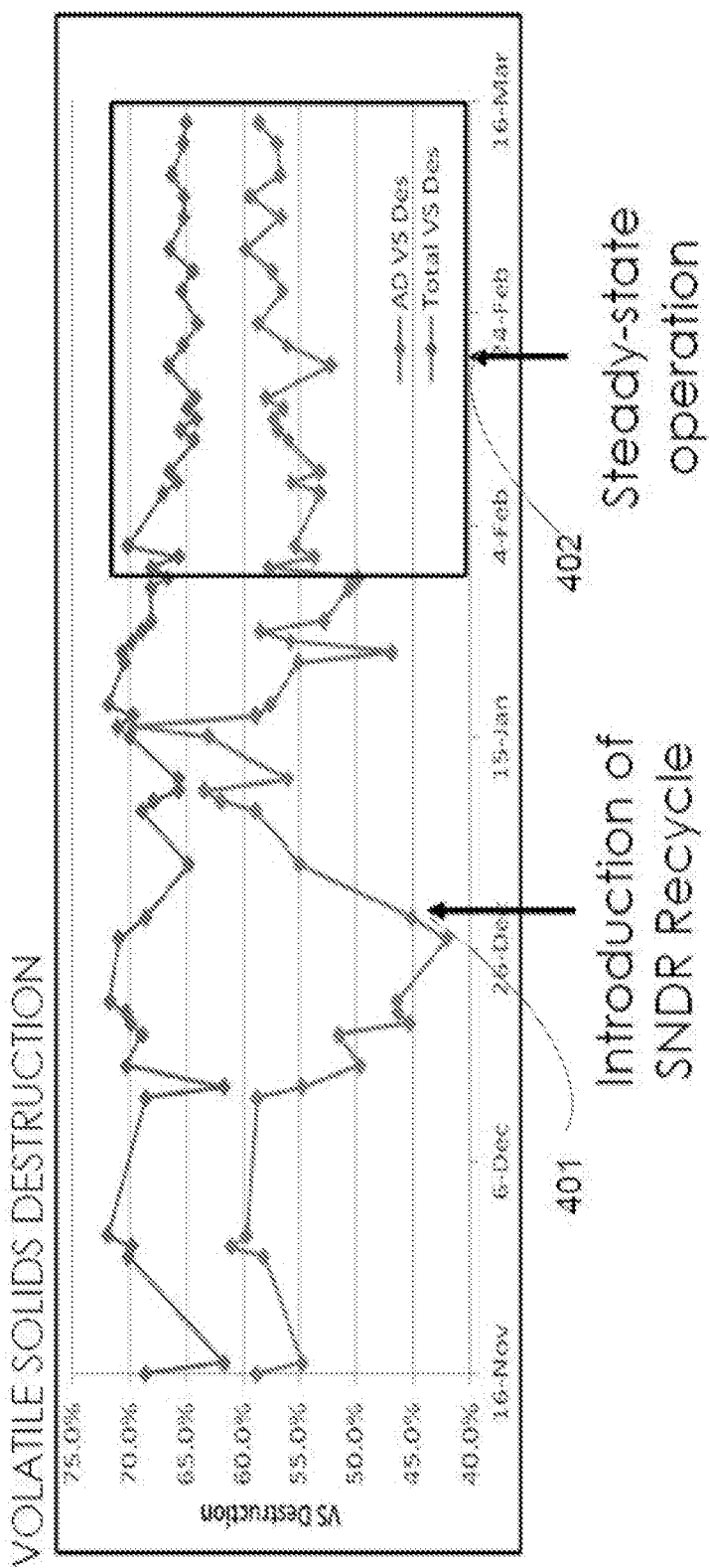

Unexpectedly, the recycling of material from the mesophilic digestion reactor to the acid hydrolysis reactor can improve destruction of volatile solids in the anaerobic digestion reactor. FIG. 4 shows the percentage of volatile solid destruction in the anaerobic digestion reactor, and in the total digestion process. Recycling material from the mesophilic digestion reactor (SNDR) and introducing it to the acid hydrolysis reactor resulted in a dramatic increase in volatile solids destruction in the anaerobic digestion reactor, raising it from 45% to being generally higher than 55%. A steady-state operation was achieved in which VS destruction in the anaerobic digestion reactor was between 50% and 60%, and generally between 55% and 60%, while the total VS destruction was between 60% and 70%, generally about 65%.

The results in FIG. 4 indicate that lower VS destruction in the anaerobic digestion reactor corresponds with the reactor being in a stressed condition. By recycling material from the mesophilic digestion reactor, the stressed condition was relieved and the anaerobic digestion reactor recovered. When the anaerobic digestion reactor was in a stressed condition, the thermophilic and mesophilic digestion reactors performed a greater degree of volatile solids destruction.

Figure 5:
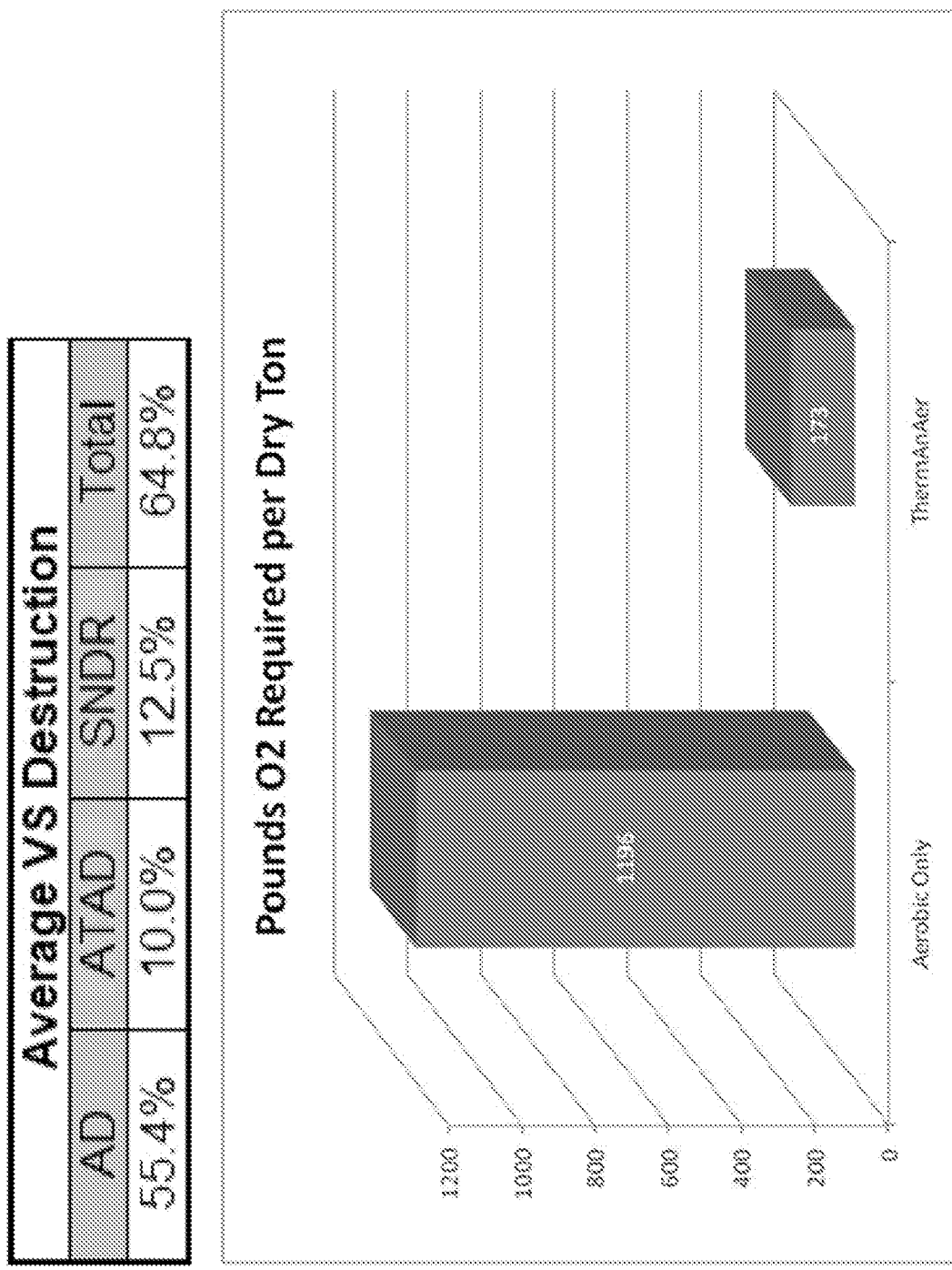

FIG. 5 provides measurements of oxygen requirements for the experimental treatment system, compared to an aerobic treatment system. As illustrated in FIG. 5, the present method and system significantly reduced the aeration requirements (by 82.9%) and the energy requirements (by 33.2%).

Figure 6:
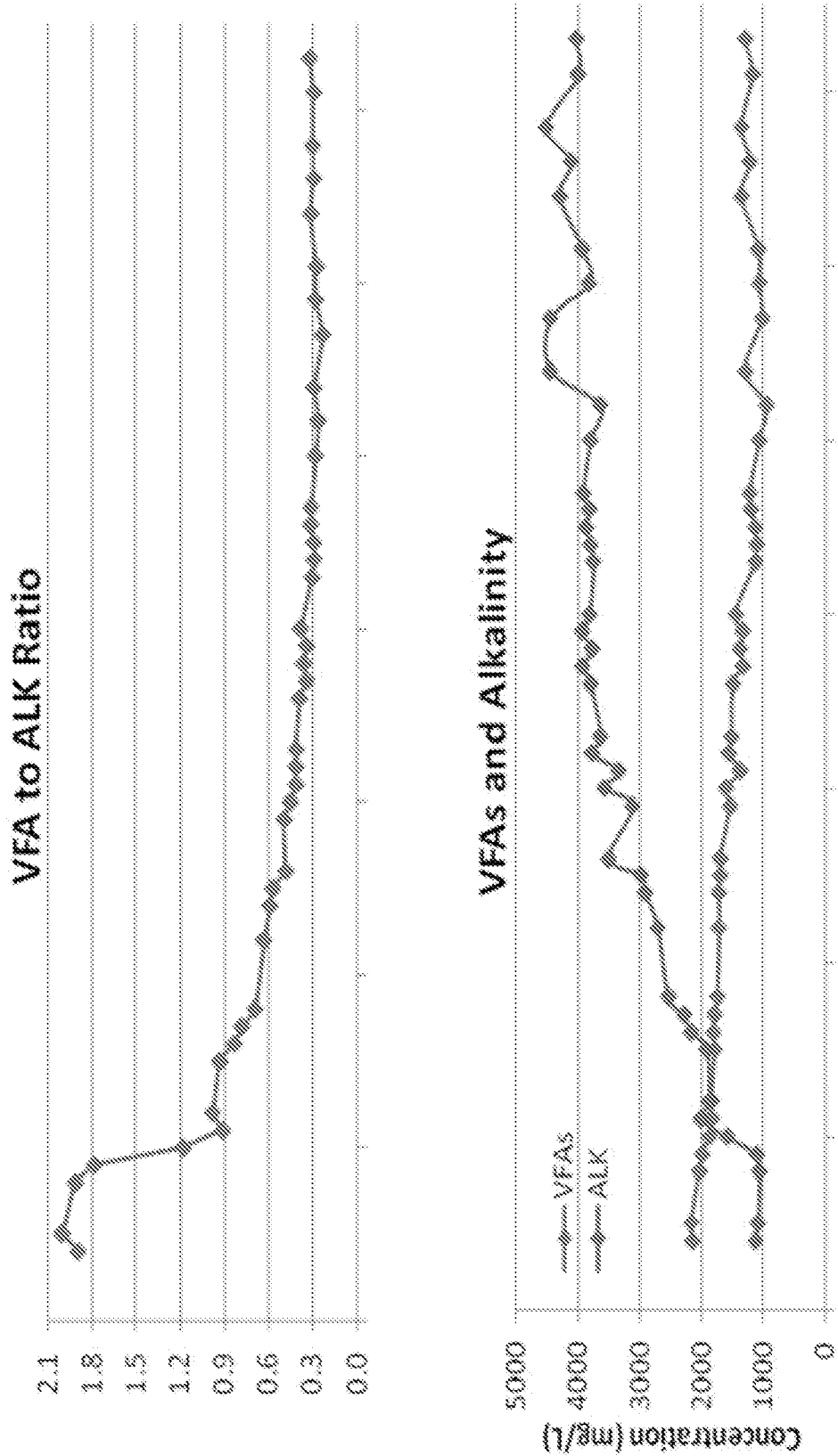

FIG. 6 shows measurements of VFA and alkalinity (both the ratio and the concentrations). By recycling material from the mesophilic digestion reactor to the acid hydrolysis reactor, alkalinity was increased (from 1000 to about 4000 mg/L) and VFA decreased (from about 2000 to about 1000 mg/L), and an improved anaerobic digestion environment was provided, with a VFA to ALK ratio of about 0.3.

Figure 7:
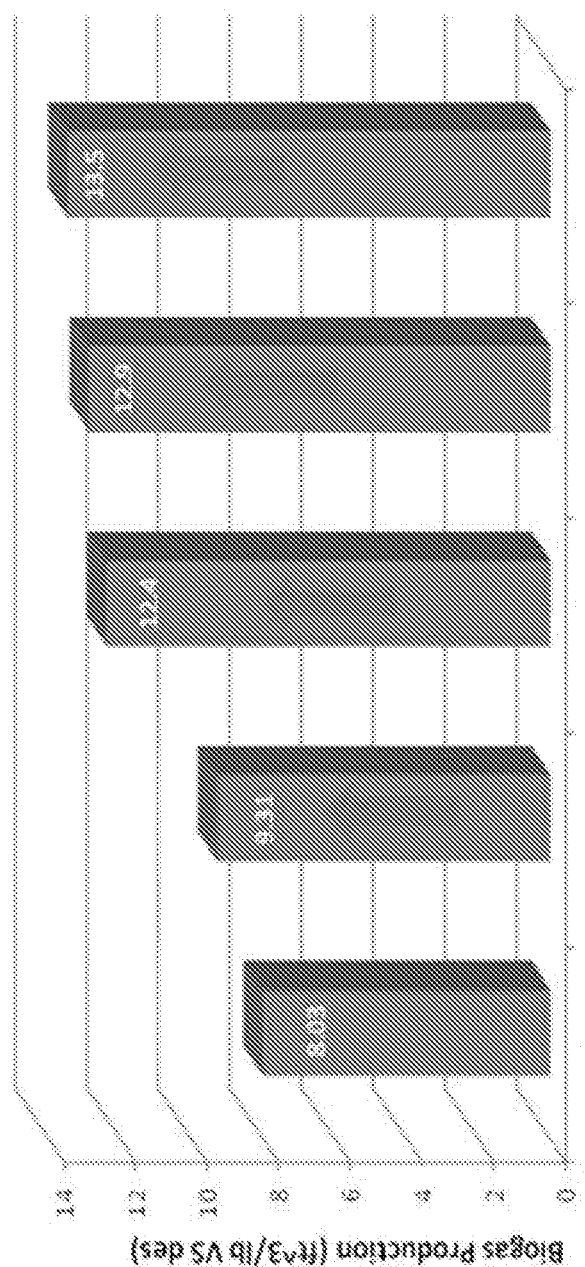

FIG. 7 shows that biogas production significantly increased as an unexpected result of lowering VFA so as to prevent overloading, by recycling material from SNDR to the acidic hydrolysis reactor.

FIG. 8 provides analysis of several parameters from an experimental operation of the present methods in a pilot scale of the system illustrated in FIGS. 1 and 2.

FIG. 9 provides exemplary data regarding dewatering of the mesophilically digested biosolids from that method. Reduced chemical consumption is attributed to improved breakdown of COD and extracellular polymeric substances (EPS). There was a 90% phosphorous reduction from SNDR liquor to centrate.

Example 2

In a process and system according to Example 1, a controller is in signal communication with inlets, outlets, valves and pumps connected to each of the digestion reactors, so that input and output of material to each of the reactors is controlled. By controlling those inputs and outputs, a hydraulic retention time (HRT) for material in each reactor is produced. In the present example, the HRT in the acidic hydrolysis environment is 2-3 days, the HRT in the anaerobic digestion environment is 12-15 days, the HRT in the thermophilic aerobic digestion environment is 4 days, and the HRT in the mesophilic digestion environment is 10 days. The mesophilically digested biosolids are Class A biosolids.

Example 3

Figure 11:
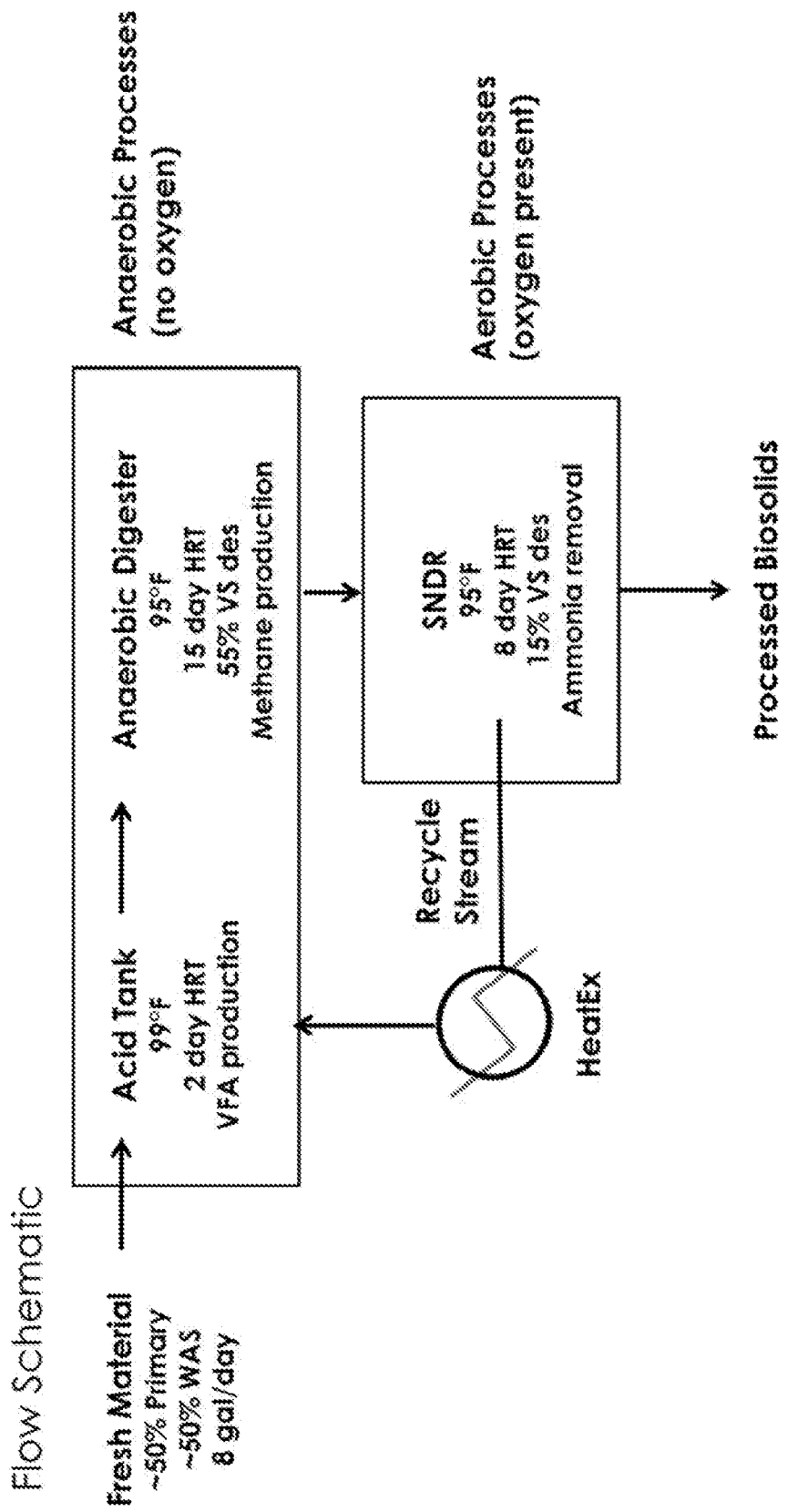
FIG. 11 illustrates an experimental system used in Example 3.

In this example, another experimental biosolids digestion system is employed. The system comprises an acidic hydrolysis reactor, an anaerobic reactor, and a mesophilic digestion reactor (an SNDR). The system is generally illustrated in FIG. 11. Among other features, it includes a transfer of material from the SNDR to the acidic hydrolysis reactor.

Figure 12:
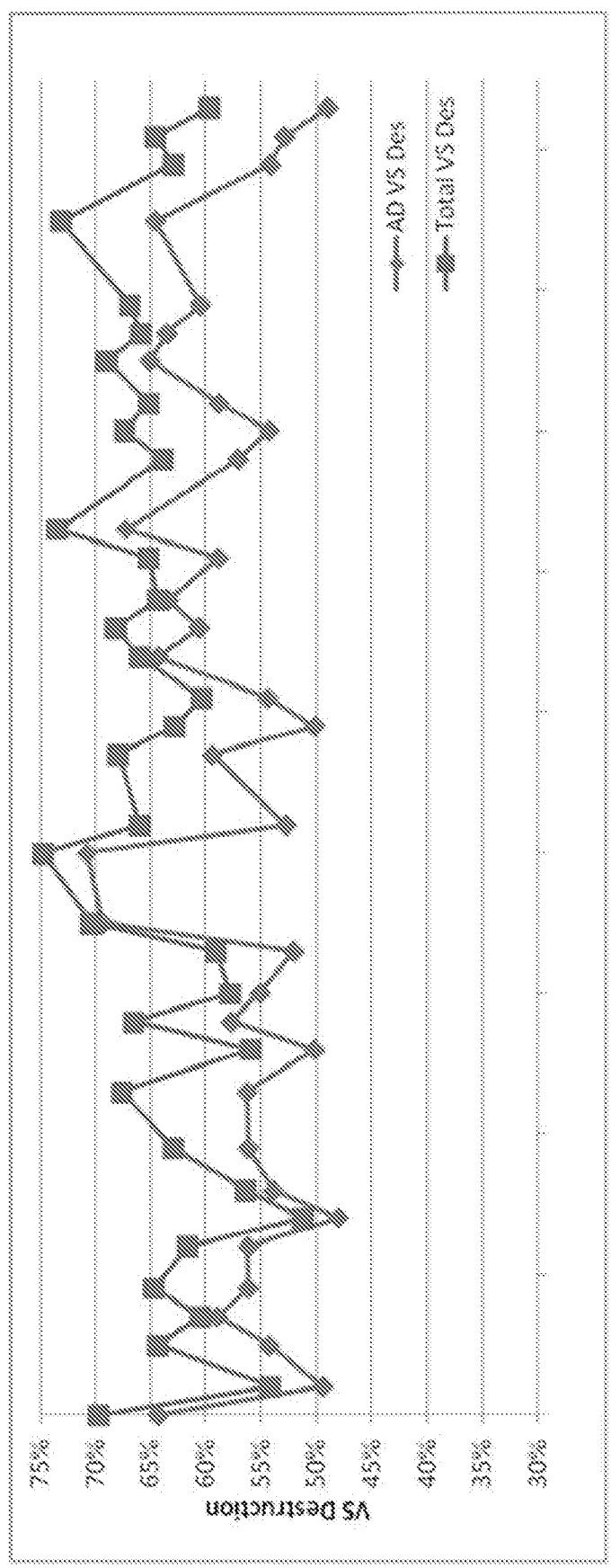

FIGS. 12 and 13 show measurements of volatile solids destruction by the anaerobic digestion environment and by the total treatment, over an experimental period of several weeks. The measurements show that the fully mesophilic treatment achieves volatile solids destruction comparable to treatment that included thermophilic treatment, with a total VS destruction exceeding 60%. It was also found that continued operation of the anaerobic reactor came with an increase in destruction of volatile solids. The SNDR picked up the load of VS destruction previously provided by the ATAD. Advantages from removal of the ATAD are significantly decreased capital and operational costs.

FIG. 14 shows measurements of parameters from the anaerobic digestion reactor and from biogas produced by the method. The measurements show that the method maintained low overall VFAs and low VFA to ALK ratio in the anaerobic digestion reactor, along with consistent performance. The biogas had consistently low concentrations of hydrogen sulfide and ammonia, with a methane concentration greater than 60% v/v, and over 13 cubic feet of biogas per pound of volatile solid destruction.

FIG. 15 shows that the fully mesophilic treatment provided material that was relatively easy and economical to dewater. It yielded further improved dewatering results, lower demand for coagulant and polymer, and improved cake solids.

Example 4

In this example, an experimental phosphorus recovery system is employed. The system comprises an acid source, an acidification tank, a base source, a dewatering tank, and a precipitation tank. The system is generally illustrated in FIG. 3.

FIG. 16 sets forth results from initial testing on pathogen kill from the acidification tank. The results indicate total pathogen destruction in the acidified biosolids, which had no detectable Fecal coliform microorganisms. These results indicate that the present methods and systems can be used to produce Class A biosolids.

Figure 17:
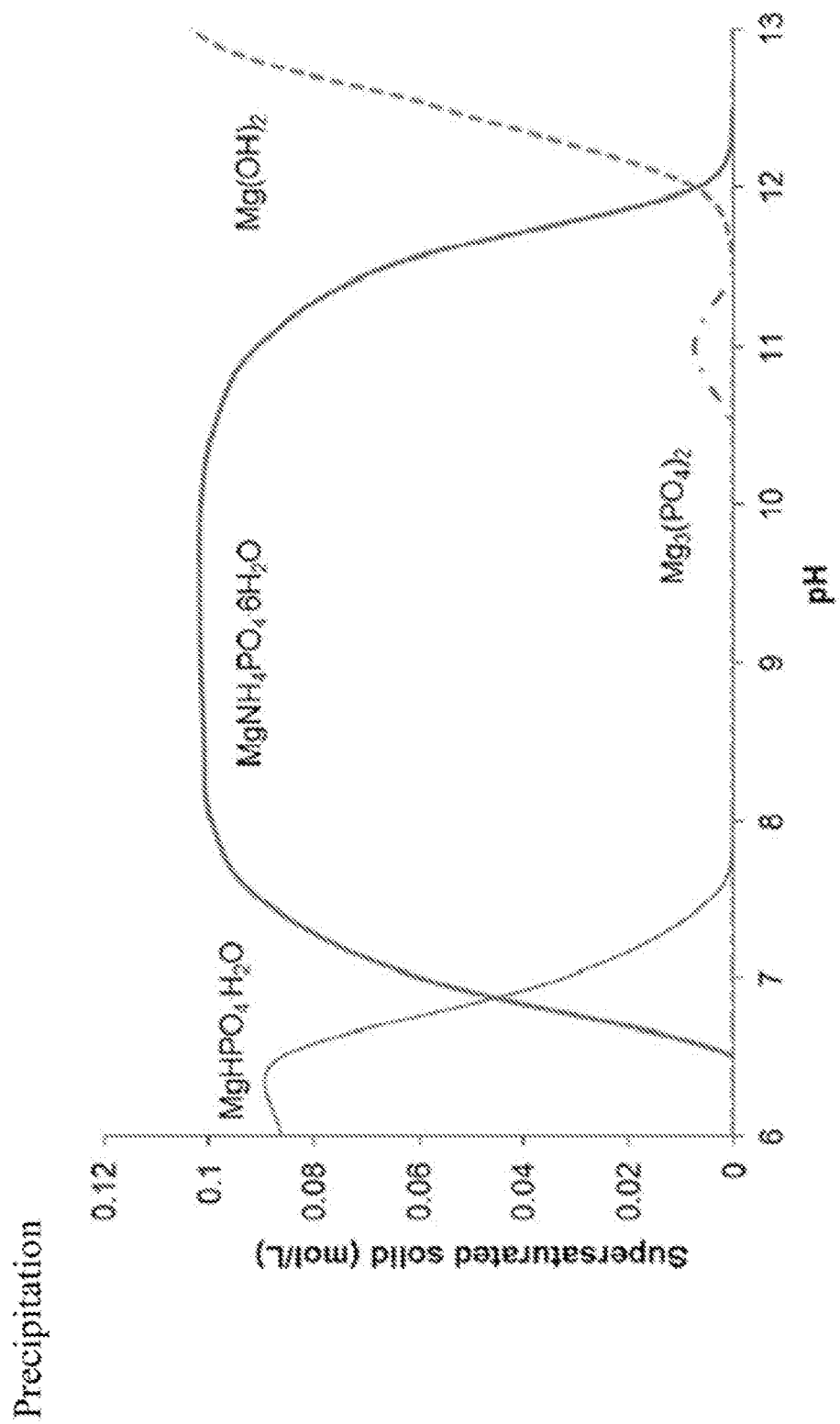

FIG. 17 illustrates that phosphorous-containing precipitation (indicated by supersaturation) as a function of pH. The liquid stream had a high content of phosphorous, making struvite removal desirable. It was found that the phosphorous-containing precipitate readily formed. Magnesium iron (Mg2t) can be natural or added as a supplement to the liquid stream.

FIG. 18 shows the high levels of phosphorus recovery using the present methods and systems. Over 70% of total phosphorus was removed, which is unexpected high compared to conventional methods. Over 90% of soluble phosphorus was removed.

Example 5

In this example, a biosolids digestion system comprises an acidic hydrolysis reactor, an anaerobic reactor, and a mesophilic digestion reactor. The system is generally illustrated in FIG. 11. Among other features, it includes a transfer of material from the mesophilic digestion reactor to the acidic hydrolysis reactor. In this example, the system is employed so as to transfer material from the mesophilic digestion reactor to the acidic hydrolysis reactor at a high recycle rate.

The recycle rate from the mesophilic digestion reactor to the acidic hydrolysis reactor were tested in the range of 60-200% of the incoming feed (sludge derived from wastewater). The varying rates successfully controlled different parameters. Recycling 60% of the incoming feed amount kept the VFA/ALK in check and reduced $H_2S$ by 80%. Recycling 100% of the incoming feed amount lowered the ammonia and pH from 2000 mg/L to 1500 mg/L and from 7.2 to 7.1, respectively. Recycling 200% of the incoming feed amount further lowered the ammonia to 500 mg/L and the pH to 6.7, bringing the digester out of the precipitation range for struvite.

One purpose was to reduce the pH and ammonia values in the anaerobic digestion by removing a higher percentage of the ammonium carried in the system therefor reducing alkalinity and pH.

These recycle rates proved to be very effective with the anaerobic digestion reactor operating at a solubility of about 500 mg/L $NH_4$ in a pH range of 6.7-6.8. Ammonium toxicity concerns were reduced, and digestion efficiency has remained the same. VFA/Alkalinity remained in the correct range but the HRT in the anaerobic reactor/environment was increased to 15 days. Biogas production has remained the same. Denitrification is occurring in the acid phase.

Operation at such recycle rates produced pH values that maintain potential nescience precipitates into the soluble range so nutrients remain in a liquid state. This reduces potential formation of struvite or other precipitates that plug piping, increase equipment wear and reduce tank volumes. Additionally, maintaining phosphorous solubility allows phosphorus recovery (such as recovery of brushite or struvite) following dewatering in centrate/filtrate.

The high recycle rate also provided nitrates to the acid phase reactor in sufficient amounts to inhibit sulfate reducing bacterial from producing $H_2S$. This reduces $H_2S$ toxicity and corrosion concerns.

Operation of the system in this example employed or promoted the following chemical pathways: in the acidic hydrolysis environment, nitrogen is released during hydrolysis; in the anaerobic digestion environment, nitrogen reacts with carbonates to form ammonium; in an aerobic digestion environment, ammonium is oxidized by biological nitrification to nitrites then to nitrates; by transfer to the acidic hydrolysis environment, nitrates are reduced by biological de-nitrification to $N_2$ gas and sulfates; in the acidic hydrolysis environment, nitrates inhibit sulfide reducing bacteria.

Example 6

In this example, a biosolids digestion system comprises an acidic hydrolysis reactor, an anaerobic reactor, and a mesophilic digestion reactor. The system is generally illustrated in FIG. 11. Among other features, it includes a transfer of material from the mesophilic digestion reactor to the acidic hydrolysis reactor. In this example, the system is employed so as to promote nitrification in the mesophilic digestion environment while inhibiting denitrification.

Operation of the system in this example employed or promoted de-nitrification in an anaerobic environment, which releases oxygen into the hydrolyzed biosolids. This improved efficiency by adding oxygen in one reaction and returning it into a different tank for a different purpose upon its release. Other advantages include additional BOD removal; $N_2$ gas is released essentially wasting nitrogen out of the system; sulfates are formed but remain is solution as a salt and pass through the system; and separating nitrification and de-nitrification into two separate operations. By performing one process step (nitrification) rather than two in the mesophilic digestion reactor has the potential of allowing for a shorter HRT based upon growth kinetics of the nitro culture. There is also a potential to use less energy by oxidizing to nitrite.

The system is operated to promote nitrification and inhibit denitrification by continuously aerating the material in the mesophilic digestion reactor, such as by having a blower remain on continuously, with the blower speed being ORP controlled.

Example 7

In this example, the concentration of $H_2S$ was measured in biogas from an anaerobic digestion reactor in a system is generally illustrated in FIG. 3. Biogas was collected as off-gas from the ractor, and a Draeger tube was used to measure hydrogen sulfide. The Draeger tube draws in 100 mL of gas which reacts with the chemicals in the tube to give a measure of $H_2S$. When $H_2S$ is detected, white crystals in the tubes turns brown. 1000 mL of biogas from the reactor was pulled into the Draeger tube, and there was no visible color change, indicating a $H_2S$ concentration less than 0.1 ppm.

Example 8

Figure 20:
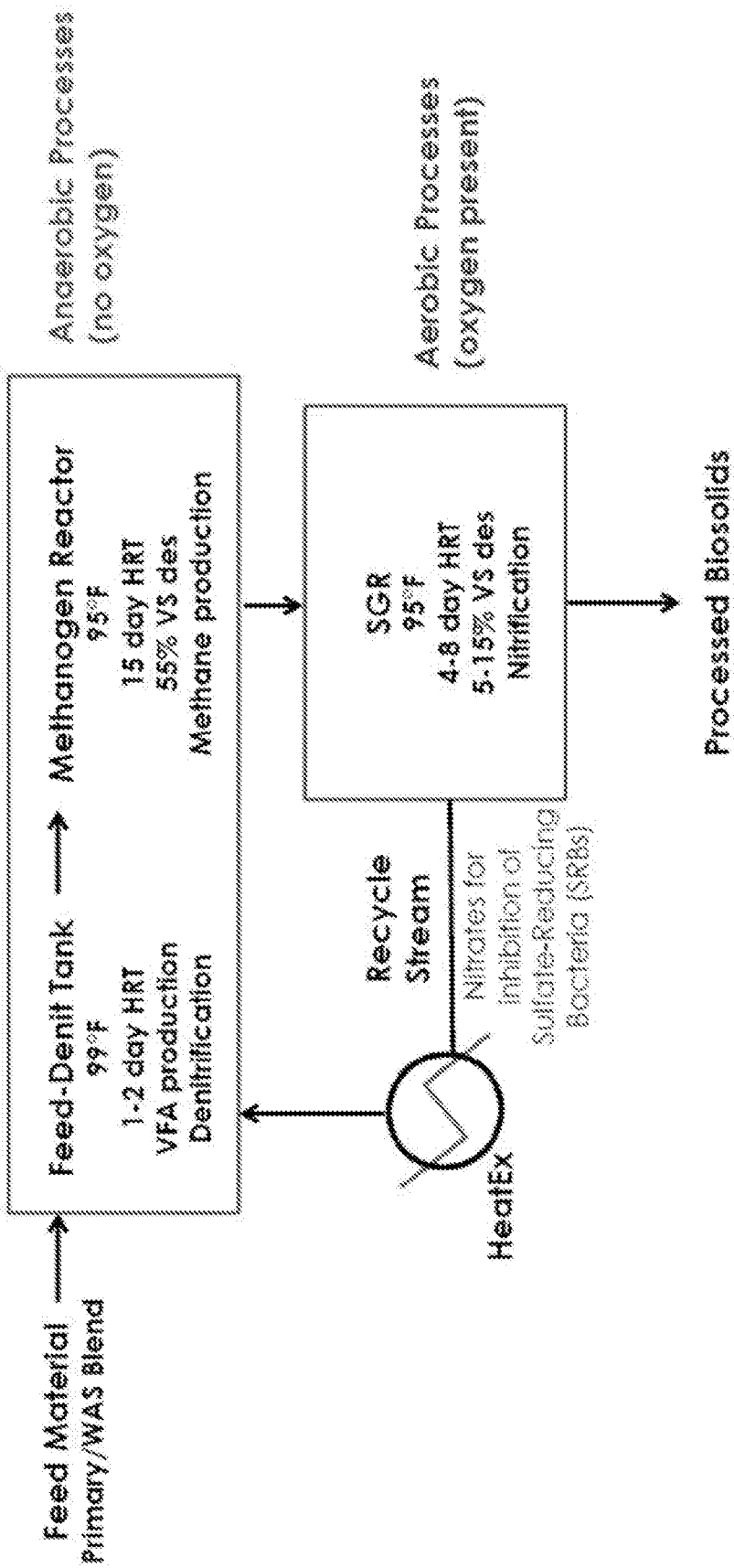
FIG. 20 illustrates an experimental system used in Example 8.

In this example, an experimental biosolids digestion system is employed. The system comprises an acidic hydrolysis reactor (a feed-denitrification reactor), an anaerobic reactor (a methanogen reactor), and a mesophilic digestion reactor (a sweet gas reactor (SGR)). The system is generally illustrated in FIG. 20. Among other features, it includes a transfer of material from the sweet gas reactor (SGR) to the feed-denitrification (feed-denit) reactor.

Figures 21, 22A, 22B, 22C:
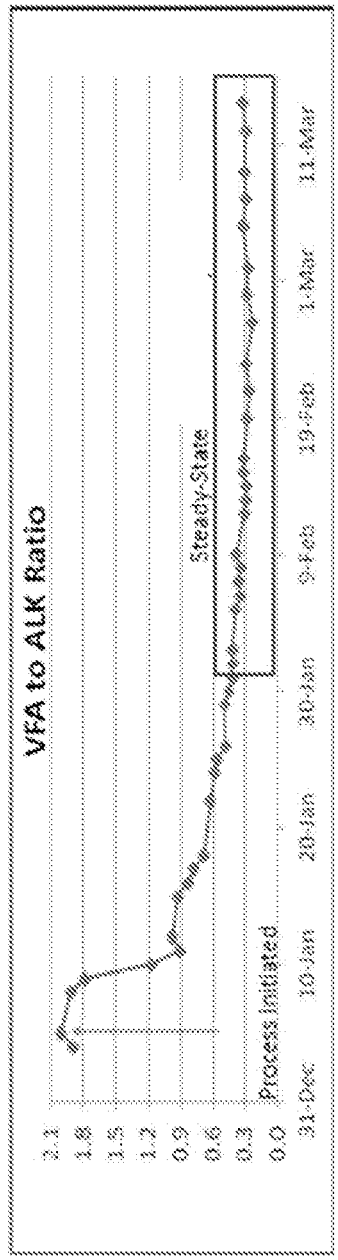

Recycling of material from the SGR to the feed-denit reactor improved destruction of volatile solids and increased biogas production. FIG. 21 shows measurements of the VFA and alkalinity ratio. By recycling material from the SGR to the feed-denit reactor, alkalinity was increased and VFA decreased, and an improved anaerobic digestion environment was provided. Research suggests a VFA to ALK ratio of 0.3 designates healthy anaerobic digester, and the steady-state average was 0.28 in this example. This is an improvement over an overloaded anaerobic digestion environment which had decreased pH, VS destruction, and biogas production.

FIGS. 22A, 22B and 22C provide analysis of several parameters from this exemplary process. It was found that continued operation of the anaerobic digestion environment came with an increase in VS destruction. 60% recycle maintained a VFA/ALK ratio under 0.3. There were no spikes in VFA concentration or foaming events, and there was low $NH_3$ and $H_2S$ in biogas produced by the process. In fact, biogas production was in upper end of literature values.

Figure 23:
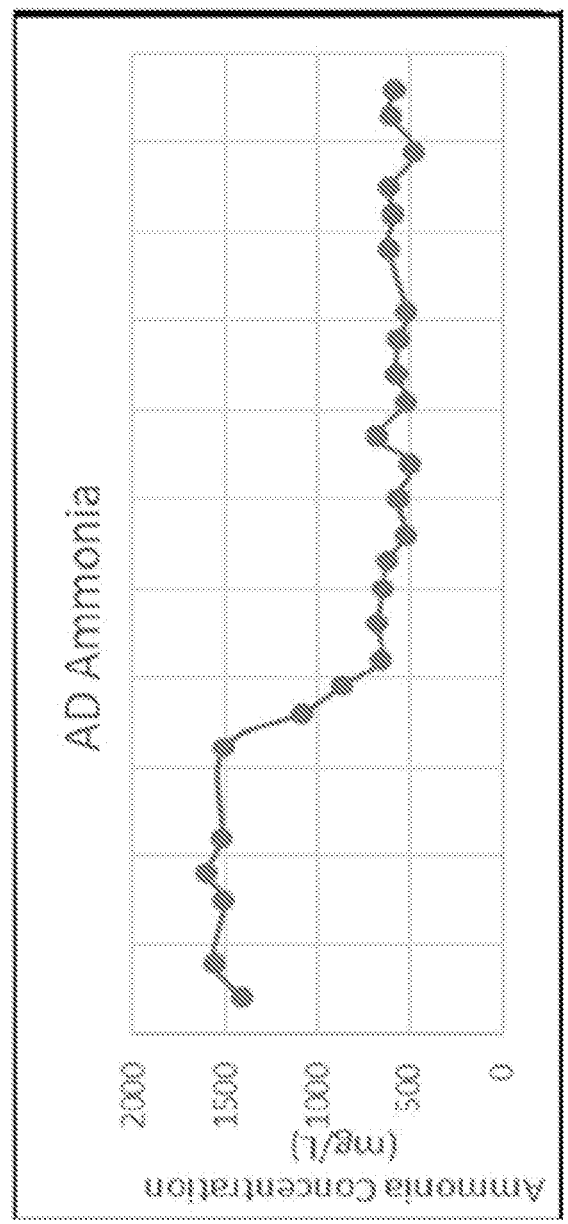
Figure 24:
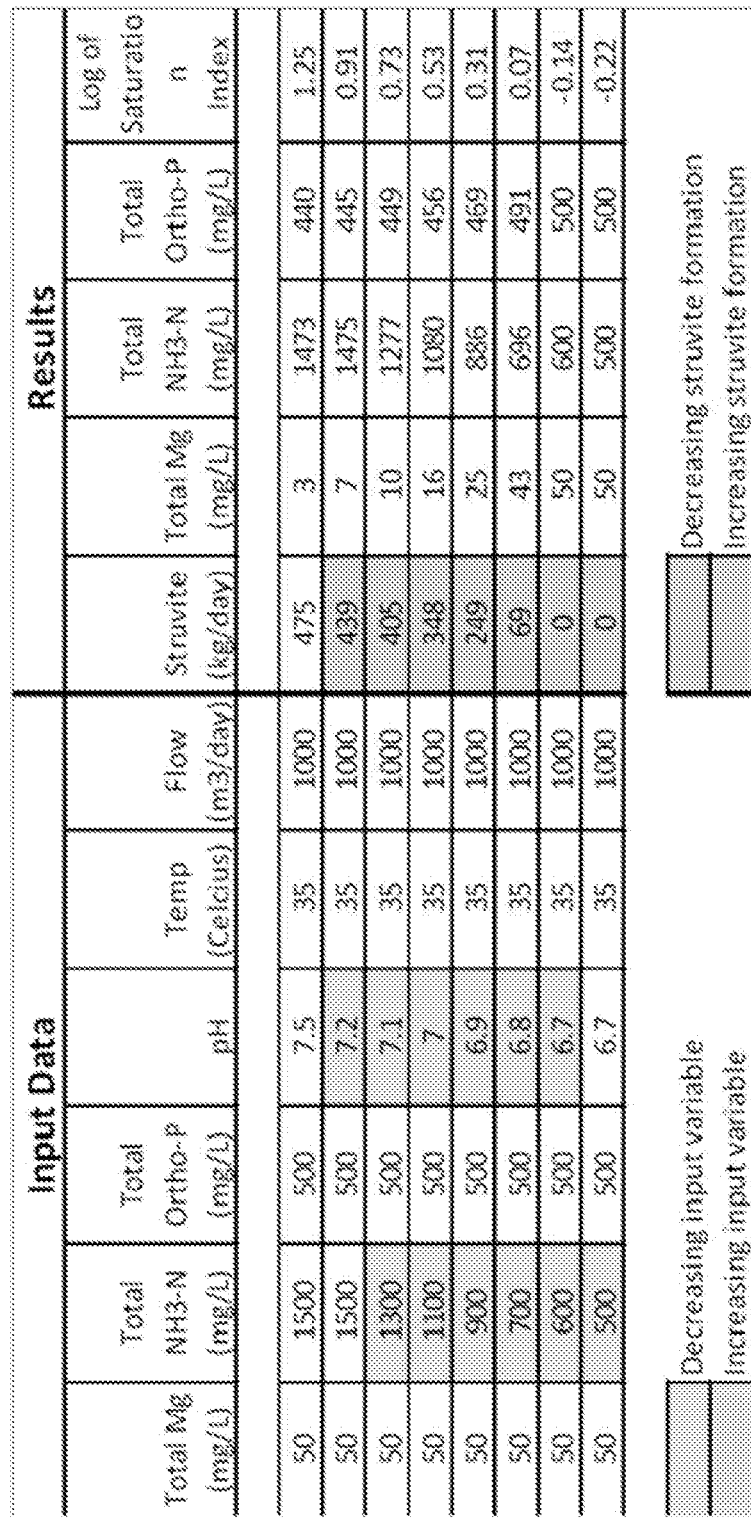
Figure 25:
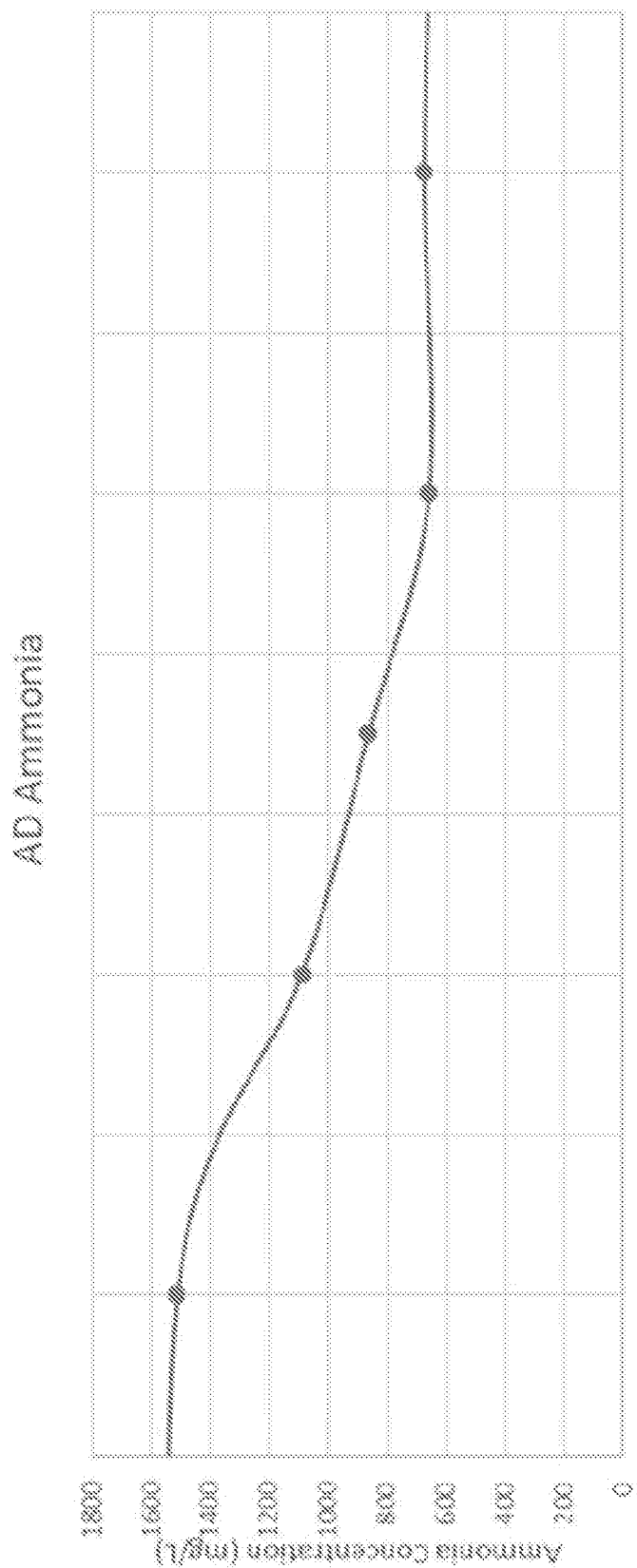
Figures 26, 27:
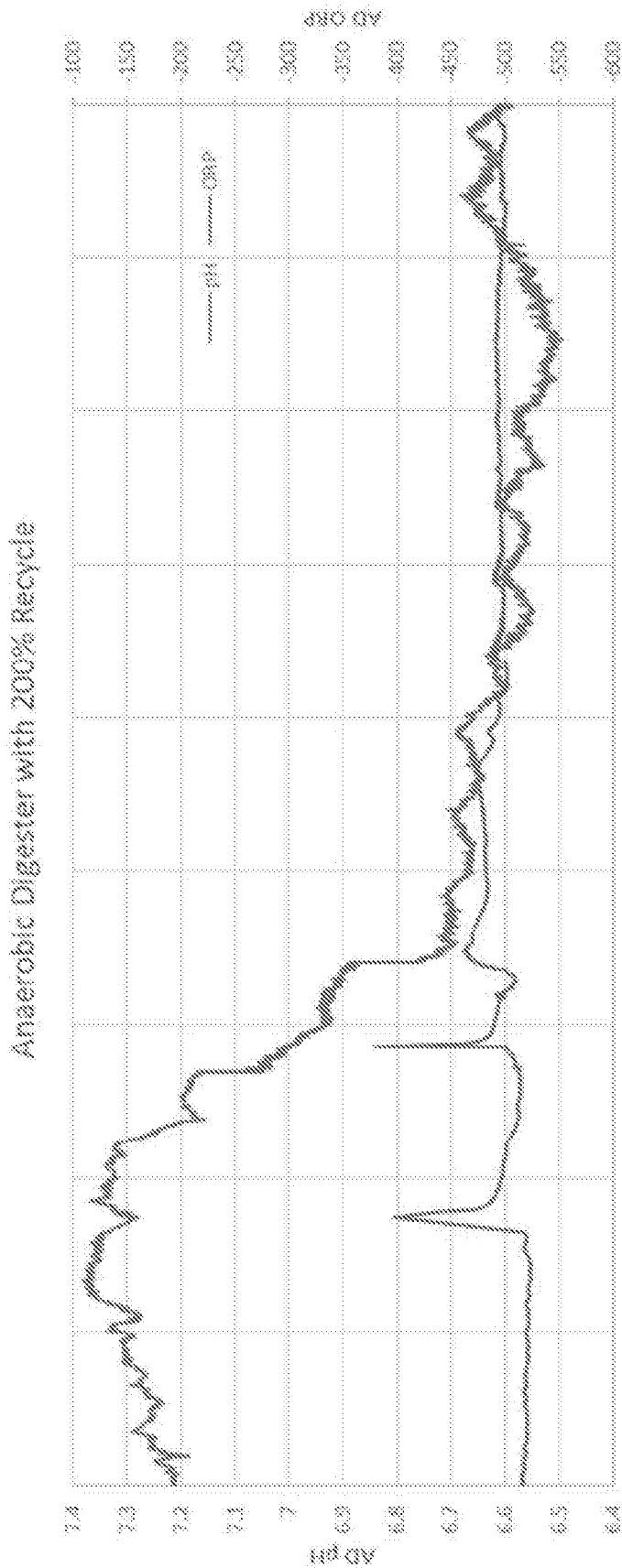

FIGS. 23 to 27 show the benefits from increasing SGR recycle from 60% to 200% of daily feed. As illustrated in FIGS. 23 and 24, consistent VS destruction and biogas production were observed, while ammonia decreased from 1500 mg/L to 500 mg/L (measured over approximately three and a half months). Maintaining a lower ammonia concentration kept pH slightly lower (from 7.2 to 6.7). Lower ammonia and pH both decreased struvite potential. FIGS. 25 and 26 show reductions in ammonia concentration, and pH in the anaerobic digestion reactor, and a relatively steady ORP in the anaerobic digestion reactor. These were measured over a nineteen day period. These measurements show a direct correlation between decrease of ammonia and pH. This is a result of decreasing basic ammonium and increasing acidic nitrates, and it provides for controlled pH adjustment in the methanogen reactor.

FIG. 27 shows measurements of parameters from the anaerobic digestion reactor and from biogas produced by the process employed in this example. The biogas had consistently low concentrations of hydrogen sulfide and ammonia, with a methane concentration greater than 60% v/v, and over 13 cubic feet of biogas per pound of volatile solid destruction. The process had the surprising effect of lowering $H_2S$ in biogas to <1 ppm, such that it was non-detectable via Draeger tube. Nitrates (NO3-) supplied to the feed-denit tank inhibited activity of sulfate-reducing bacteria (SRBs) that produce $H_2S$. The process effectively shifted denitrification to the feed-denit tank. In this way, the process reduces nitrates and oxidizes sulfides in one step.

EXEMPLARY EMBODIMENTS

Exemplary embodiments provided in accordance with the presently disclosed subject matter include, but are not limited to, the following:

1. A process for digesting biosolids and producing biogas comprising:
   hydrolyzing insoluble organic polymers in a sludge derived from wastewater in an acidic hydrolysis environment having a pH between 5 and 6 to produce hydrolyzed biosolids, wherein the hydrolyzing of said insoluble organic polymers yields volatile fatty acids (VFAs), and wherein the acidic hydrolysis environment is adapted to yield a reduced or low amount of methane;
   fermenting the VFAs of the hydrolyzed biosolids in an anaerobic digestion environment to produce anaerobically digested biosolids and biogas;
   digesting the anaerobically digested biosolids in a thermophilic aerobic digestion environment to produce thermophilically digested biosolids;
   digesting the thermophilically digested biosolids in a mesophilic digestion environment to produce mesophilically digested biosolids.

2. A process for digesting biosolids and producing biogas comprising:
   hydrolyzing insoluble organic polymers in a sludge derived from wastewater in an acidic hydrolysis environment having a pH between 5 and 6 to produce hydrolyzed biosolids, wherein the hydrolyzing of said insoluble organic polymers yields volatile fatty acids (VFAs), and wherein the acidic hydrolysis environment is adapted to yield a reduced or low amount of methane;

fermenting the VFAs of the hydrolyzed biosolids in an anaerobic digestion environment to produce anaerobically digested biosolids and biogas;

digesting the anaerobically digested biosolids in a mesophilic digestion environment to produce mesophilically digested biosolids.

3. The process of embodiment 1 or 2, further comprising recovering at least 10 cubic feet of biogas per pound of volatile solids destruction by the anaerobic digestion environment.

4. The process of any of the above embodiments, wherein the biogas is at least 60% v/v methane, alternatively at least 70% v/v methane.

5. The process of any of the above embodiments, further comprising controlling input and output of material to the acidic hydrolysis environment and the anaerobic digestion environment is to provide a hydraulic retention time (HRT) for material in each, wherein the HRT in the acidic hydrolysis environment is shorter than the HRT in the anaerobic digestion environment.

6. The process of any of the above embodiments, further comprising controlling input and output of material to each of the digestion environments to provide a hydraulic retention time (HRT) for material in each, wherein the HRT in the acidic hydrolysis environment is 1-3 days, or 2-3 days, the HRT in the anaerobic digestion environment is 12-15 days, the HRT in the thermophilic aerobic digestion environment is 4 days, and the HRT in the mesophilic digestion environment is 1-10 days, or 4-10 days, and the mesophilically digested biosolids are Class A biosolids.

7. The process of any of the above embodiments, wherein material from the mesophilic digestion environment is transferred to the acidic hydrolysis environment directly.

8. The process of embodiment 7, further comprising:

measuring one or more of pH, ammonia, VFA, sulfur, $CO_2$, or sCOD in the anaerobic digestion environment to obtain one or more measurements; and adjusting the recycling of the transfer of mesophilically digested biosolids based on the one or more measurements.

9. The process of any of the above embodiments, wherein the amount of recycle is sufficient to lower solids in the acidic hydrolysis environment to a desired concentration, and/or to lower one or both of VFAs and VFA to ALK ratio in the anaerobic digestion environment.

10. The process of any of the above embodiments except for embodiment 2, wherein autothermal thermophilic aerobic digestion is used to produce the thermophilically digested biosolids.

11. The process of any of the above embodiments, further comprising:

adjusting the mixing of the digested biosolids with the oxygen-containing fluid to promote nitrification and denitrification of the biosolids in the mesophilic digestion environment, based on the measured parameter.

12. A system for digesting biosolids comprising:

an acidic hydrolysis reactor;

an anaerobic digestion reactor fluidly connected to the acidic hydrolysis reactor so as to receive hydrolyzed biosolids, wherein the anaerobic digestion reactor is adapted for maintaining an anaerobic digestion environment to produce anaerobically digested biosolids;

a thermophilic aerobic digestion reactor fluidly connected to the anaerobic digestion reactor so as to receive the anaerobically digested biosolids, wherein the thermophilic aerobic digestion reactor is adapted for maintaining a temperature and oxygen content sufficient for a thermophilic aerobic digestion environment to produce thermophilically aerobically digested biosolids;

a mesophilic digestion reactor fluidly connected to the thermophilic aerobic reactor so as to receive the thermophilically aerobically digested biosolids, wherein the mesophilic digestion is adapted for alternating nitrification and denitrification or simultaneous nitrification and denitrification of digested biosolids to produce mesophilically digested biosolids.

13. A system for digesting biosolids comprising:

an acidic hydrolysis reactor;

an anaerobic digestion reactor fluidly connected to the acidic hydrolysis reactor so as to receive hydrolyzed biosolids, wherein the anaerobic digestion reactor is adapted for maintaining an anaerobic digestion environment to produce anaerobically digested biosolids;

a thermophilic aerobic digestion reactor fluidly connected to the anaerobic digestion reactor so as to receive the anaerobically digested biosolids, wherein the thermophilic aerobic digestion reactor is adapted for maintaining a temperature and oxygen content sufficient for a thermophilic aerobic digestion environment to produce thermophilically aerobically digested biosolids;

a mesophilic digestion reactor fluidly connected to the thermophilic aerobic reactor so as to receive the thermophilically aerobically digested biosolids, wherein the mesophilic digestion is adapted for nitrification of digested biosolids to produce mesophilically digested biosolids.

14. The system of any of the above embodiments, further comprising a biogas collector fluidly connected to the anaerobic digestion reactor.

15. The system of any of the above embodiments, further comprising a recycle conduit between the acidic hydrolysis reactor and one or both of the mesophilic digestion reactor and the thermophilic digestion reactor.

16. The system of any of the above embodiments, further comprising a controller operatively connected to one or more sensors and to the recycle conduit, wherein the controller is adapted for adjusting recycle of material from the mesophilic reactor and/or the thermophilic reactor to the acidic hydrolysis reactor based upon input from one or more of the sensors and/or tests.

17. The system of any of the above embodiments, further comprising a controller in signal communication with each of the reactors, wherein the controller is configured to control input and output of material to each of the digestion reactors to provide a hydraulic retention time (HRT) for material.

18. A method for removing phosphorus from conditioned biosolids, the method comprising:

providing conditioned biosolids having relatively low alkalinity, adding an acid to the conditioned biosolids when the biosolids have been thermophilically digested to reduce pH to 4 or less to produce acidified biosolids rich in soluble phosphorus;

adjusting the pH of the acidified biosolids to 4 or higher;

producing phosphorus-rich centrate by separating said centrate from biosolids from dewatered digested phosphorus-lean biosolids in the acidified biosolids;

adjusting the pH of the centrate biosolids to 7 or higher;

recovering a phosphorus-rich precipitate from the centrate; and removing a phosphorus-lean effluent.

19. A system for removing phosphorus from conditioned biosolids, the system comprising:

an acidification tank fluidly connected to a source of conditioned biosolids;

an acid source configured to add an acid to conditioned biosolids;

a liquid/solid separation tank fluidly connected to the acidification tank, wherein the separation tank is adapted to separate the acidified biosolids into a phosphorus-rich centrate biosolids and a dewatered digested phosphorus-lean biosolids;

a precipitation tank fluidly connected to the separation tank; and a base source fluidly configured to add a base to the precipitation tank.

20. The method or system of embodiments 18 and 19, wherein the conditioned biosolids have a pH of 7 or lower.

21. The method or system of any of embodiments 18 to 20, wherein the conditioned biosolids are mesophilically digested biosolids from any of embodiments 1 to 17.

22. The method or system of any of embodiments 18 to 21, further comprising adding water to the acidified biosolids before or during the adjusting of the pH.

23. The method or system of any of embodiments 18 to 22, further comprising adding polymer to the acidified biosolids before or during the adjusting of the pH.

24. The method or system of any of embodiments 18 to 23, further comprising adding a metal source to the precipitation tank.

25. The method or system of any of embodiments 18 to 24, wherein the dewatered digested phosphorus-lean biosolids are Class A biosolids.

26. The method or system of any of embodiments 18 to 25, further comprising packaging the phosphorous-rich precipitate as a fertilizer, or connecting packaging equipment to an outlet of the separation tank.

27. The method or system of any of embodiments 18 to 26, wherein at least a portion of the effluent is combined with the acidified biosolids.

28. The method or system of any of embodiments 18 to 26, wherein at least a portion of material from the acidification tank and/or the precipitation tank is transferred to the acidic hydrolysis environment of any of embodiments 1 to 11 or to the acidic hydrolysis reactor of any of embodiments 12 to 17.

29. A process for digesting biosolids comprising:

hydrolyzing insoluble organic polymers in a sludge derived from wastewater in an acidic hydrolysis environment having a pH between 5 and 6 to produce hydrolyzed biosolids;

fermenting the hydrolyzed biosolids in an anaerobic digestion environment to produce anaerobically digested biosolids and biogas;

optionally digesting the anaerobically digested biosolids in a thermophilic aerobic digestion environment to produce thermophilically digested biosolids;

digesting the anaerobically digested biosolids or the thermophilically digested biosolids in a mesophilic digestion environment to produce mesophilically digested biosolids comprising nitrates at a concentration;

transferring an amount of the mesophilically digested biosolids to the acidic hydrolysis environment;

wherein the transferred amount is sufficient to (a) lower one or both of ammonia and pH in the anaerobic digestion environment in an amount sufficient to reduce precipitate formation potential; and/or (b) supply the nitrates from the mesophilic digestion environment to the acidic hydrolysis environment in an amount sufficient to inhibit activity of sulfate-reducing bacteria.

30. The process of embodiment 29, wherein the transferred amount of the mesophilically digested biosolids is sufficient to reduce formation of $H_2S$ in the anaerobic digestion environment and/or to lower concentration of $H_2S$ in the biogas.

31. The process of any of embodiments 29 or 30, further comprising measuring one or more of pH, ammonia, VFA, sulfur, $CO_2$, or sCOD in the anaerobic digestion environment to obtain one or more measurements; and adjusting the transfer of mesophilically digested biosolids based on the one or more measurements.

32. The process of embodiment 31, further comprising mixing the digested biosolids with an oxygen-containing fluid to promote nitrification of the biosolids in the mesophilic digestion environment and to inhibit denitrification.

33. The process of any of embodiments 29 to 32, wherein the transferred amount is sufficient to:

(a) lower the ammonia in the anaerobic digestion environment to 500 mg/L;

(b) lower the pH in the anaerobic digestion environment to 6.6;

(c) supply enough nitrates to the acidic hydrolysis environment to achieve a minimum nitrate to sulfide ratio of 8:5; or (d) limit $H_2S$ in the biogas to less than 4 ppm, or any combination of (a), (b), (c) and (d).

34. The process of any of embodiments 29 to 32, comprising transferring the mesophilically digested biosolids to the acidic hydrolysis environment at a recycle rate of at least 60%, or at least 75%, or at least 90%, or at least 100%, or at least 120%, or at least 150%, or at least 180%, or at least 200%, though lower or higher recycle rates may be employed under some conditions, in light of the teachings of the present disclosure.

35. A method for removing phosphorus from conditioned biosolids, the method comprising:

providing conditioned biosolids from the mesophilic aerobic reactor having relatively low alkalinity, adding an acid to the conditioned biosolids when the biosolids have been thermophilically digested to reduce pH to 4 or less to produce acidified biosolids rich in soluble phosphorus;

adjusting the pH of the acidified biosolids to 4 or higher;

producing phosphorus-rich centrate by separating said centrate from biosolids from dewatered digested phosphorus-lean biosolids in the acidified biosolids.

36. A system for removing phosphorus from conditioned biosolids, the system comprising:

an acidification tank fluidly connected to a source of conditioned biosolids;

an acid source configured to add an acid to conditioned biosolids that have been thermophilically digested;

a liquid/solid separation tank fluidly connected to the acidification tank, wherein the separation tank is adapted to separate the acidified biosolids into a phosphorus-rich centrate biosolids and a dewatered digested phosphorus-lean biosolids; and a precipitation tank fluidly connected to the separation tank.

37. A system for digesting biosolids comprising:

an acidic hydrolysis reactor;

an anaerobic digestion reactor fluidly connected to the acidic hydrolysis reactor so as to receive hydrolyzed biosolids, wherein the anaerobic digestion reactor is adapted for maintaining an anaerobic digestion environment to produce anaerobically digested biosolids;

a mesophilic digestion reactor fluidly connected to the anaerobic reactor so as to receive the anaerobically digested biosolids, wherein the mesophilic digestion is adapted for nitrification of digested biosolids to produce mesophilically digested biosolids having a high concentration of nitrates; and a recycle conduit fluidically connecting the mesophilic digestion reactor and the acidic hydrolysis reactor, optionally passing through a boiler or a heat exchanger.

38. A process for reducing hydrogen sulfide in biogas from wastewater comprising:

feeding a wastewater to an acidic environment having a pH between 5 and 6 to produce acidified wastewater;

transferring the acidified wastewater to an anaerobic environment to produce anaerobically treated wastewater;

transferring the anaerobically treated wastewater to an BOD/COD removal environment to produce BOD/COD reduced wastewater;

transferring the BOD/COD reduced wastewater to an aerobic environment to produce aerobically treated wastewater comprising nitrates at a concentration; and recycling an amount of the aerobically treated wastewater to the acidic environment, optionally passing through a clarifier or a heat exchanger between the aerobic environment and the acidic environment, or both;

wherein the transferred amount is sufficient to supply the nitrates from the aerobic environment to the acidic environment in an amount sufficient to inhibit activity of sulfate-reducing bacteria.

39. The process of embodiment 38, further comprising collecting biogas from the anaerobic environment, wherein the collected biogas comprises less than 4 ppm of hydrogen sulfide.

40. A system for treating wastewater comprising:

an acidic reactor;

an anaerobic reactor fluidly connected to the acidic reactor so as to receive acidified wastewater, wherein the anaerobic reactor is adapted for maintaining an anaerobic environment to produce anaerobically treated wastewater;

a BOD/COD removal reactor fluidly connected to the anaerobic reactor so as to receive the anaerobically treated wastewater, wherein the BOD/COD removal reactor is adapted for maintaining a temperature and oxygen content sufficient to reduce BOD, COD, or both, and produce BOD/COD reduced wastewater;

a mesophilic reactor fluidly connected to the BOD/COD removal reactor so as to receive the BOD/COD reduced wastewater, wherein the mesophilic digestion is adapted for nitrification of BOD/COD reduced wastewater to produce mesophilically treated wastewater; and a recycle conduit fluidically connecting the mesophilic reactor and the acidic reactor, optionally passing through a clarifier or a heat exchanger.

We claim:

1. A method for digesting biosolids and recovering phosphorus from the biosolids, the method comprising:

hydrolyzing insoluble organic polymers in a sludge derived from wastewater in an acidic hydrolysis environment to produce hydrolyzed biosolids;

fermenting the hydrolyzed biosolids in an anaerobic digestion environment to produce anaerobically digested biosolids;

optionally digesting the anaerobically digested biosolids in a thermophilic aerobic digestion environment to produce thermophilically digested biosolids;

digesting the anaerobically digested biosolids or the thermophilically digested biosolids in a mesophilic digestion environment to produce mesophilically digested biosolids;

separating the mesophilically digested biosolids into a phosphorus-rich centrate and dewatered digested phosphorus-lean biosolids; and recovering a phosphorus-rich precipitate from the phosphorus-rich centrate.

2. The method of claim 1, wherein the method comprises digesting the anaerobically digested biosolids in a thermophilic aerobic digestion environment to produce thermophilically digested biosolids.

3. The method of claim 1, wherein the method does not comprise digesting the anaerobically digested biosolids in a thermophilic aerobic digestion environment, and the anaerobically digested biosolids are digested in the mesophilic digestion environment to produce the mesophilically digested biosolids.

4. The method of claim 1, wherein the acidic hydrolysis environment has a pH less than 6.5, the anaerobic digestion environment has a pH of 6.5 to 7.5; and the mesophilic digestion environment has a pH of 6.0 to 6.8.

5. The method of claim 1, further comprising transferring the mesophilically digested biosolids to the acidic hydrolysis environment at a recycle rate of at least 60%, thereby maintaining phosphorous solubility.

6. The method of claim 5, wherein the recycle rate is at least 100%.

7. The method of claim 5, wherein the recycle rate is at least 200%.

8. The method of claim 1, further comprising adjusting the pH of the phosphorus-rich centrate to 7 or higher.

9. The method of claim 1, further comprising adding a metal source to the phosphorus-rich centrate.

10. The method of claim 9, wherein the metal source is a source of calcium or magnesium.

11. The method of claim 1, further comprising:

removing a phosphorus-lean effluent from the phosphorus-rich centrate; and transferring at least a portion of the phosphorus-lean effluent to the acidic hydrolysis environment.

12. A system for digesting biosolids and recovering phosphorus, the system comprising:

an acidic hydrolysis reactor adapted to produce hydrolyzed biosolids;

an anaerobic digestion reactor fluidly connected to the acidic hydrolysis reactor so as to receive the hydrolyzed biosolids, wherein the anaerobic digestion reactor is adapted for maintaining an anaerobic digestion environment to produce anaerobically digested biosolids;

optionally a thermophilic aerobic digestion reactor fluidly connected to the anaerobic digestion reactor so as to receive the anaerobically digested biosolids, wherein the thermophilic aerobic digestion reactor is adapted for maintaining a thermophilic aerobic digestion environment to produce thermophilically digested biosolids;

a mesophilic digestion reactor fluidly connected to the anaerobic digestion reactor, or to the thermophilic aerobic reactor if present, so as to receive the anaerobically digested biosolids or the thermophilically digested biosolids, wherein the mesophilic digestion is adapted to produce mesophilically digested biosolids;

a liquid/solid separation tank fluidly connected to the mesophilic digestion reactor, wherein the liquid/solid separation tank is adapted to separate the mesophilically digested biosolids into a phosphorus-rich centrate and dewatered digested phosphorus-lean biosolids; and a precipitation tank fluidly connected to the separation tank so as to receive the phosphorus-rich centrate.

13. The system of claim 12, wherein the system comprises the thermophilic aerobic digestion reactor.

14. The system of claim 12, wherein the system does not comprise the thermophilic aerobic digestion reactor, and the mesophilic digestion reactor is fluidly connected to the anaerobic digestion reactor.

15. The system of claim 12, further comprising a recycle conduit configured to transfer material from the precipitation tank to the acidic hydrolysis reactor.

16. The system of claim 12, wherein the mesophilic digestion reactor is a mesophilic aerobic reactor.

17. The system of claim 12, wherein the mesophilic digestion reactor is a storage nitrification/denitrification reactor (SNDR).

18. The system of claim 12, further comprising a base source fluidly connected to the precipitation tank and configured to add a base to the precipitation tank.

19. The system of claim 12, further comprising a metal source fluidly connected to the precipitation tank and configured to add metals that promote precipitation of phosphorus containing minerals to the precipitation tank.

* * * * *